United States Patent
Datta et al.

(10) Patent No.: US 9,303,341 B2
(45) Date of Patent: *Apr. 5, 2016

(54) PROCESS TO PRODUCE SOFT POLYPROPYLENE-BASED NONWOVENS

(71) Applicant: ExxonMobil Chemical Patents Inc., Baytown, TX (US)

(72) Inventors: Sudhin Datta, Houston, TX (US); Derek W. Thurman, Houston, TX (US); Chia Y. Cheng, Seabrook, TX (US); Kuangyao B. Peng, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/484,376

(22) Filed: Sep. 12, 2014

(65) Prior Publication Data

US 2014/0374967 A1 Dec. 25, 2014

Related U.S. Application Data

(62) Division of application No. 12/185,491, filed on Aug. 4, 2008, now abandoned.

(51) Int. Cl.

| | |
|---|---|
| *C08F 10/06* | (2006.01) |
| *C08L 23/14* | (2006.01) |
| *D01D 5/08* | (2006.01) |
| *D01D 10/02* | (2006.01) |
| *D04H 3/009* | (2012.01) |
| *D01D 5/098* | (2006.01) |
| *D04H 3/007* | (2012.01) |
| *C08L 23/10* | (2006.01) |
| *D01F 6/46* | (2006.01) |
| *D04H 1/4291* | (2012.01) |
| *C08F 210/06* | (2006.01) |

(52) U.S. Cl.
CPC ............... *D04H 3/009* (2013.01); *C08L 23/10* (2013.01); *D01D 5/0985* (2013.01); *D01F 6/46* (2013.01); *D04H 1/4291* (2013.01); *D04H 3/007* (2013.01); *C08F 210/06* (2013.01); *C08L 23/142* (2013.01); *C08L 2314/06* (2013.01); *Y10T 442/696* (2015.04)

(58) Field of Classification Search
CPC ........ C08F 10/06; C08F 210/06; C08L 23/14; C08L 23/142; D01D 5/08; D01D 5/0985; D01D 10/02; D01F 6/46; D04H 3/007
USPC ............... 264/103, 211.14, 211.17, 235, 555; 525/240; 526/348, 348.6, 352
See application file for complete search history.

(56) References Cited

U.S. PATENT DOCUMENTS

| | | | |
|---|---|---|---|
| 3,262,992 A | 7/1966 | Holzer et al. | |
| 3,378,606 A | 4/1968 | Kontos | |
| 3,853,969 A | 12/1974 | Kontos | |
| 3,882,197 A | 5/1975 | Fritz et al. | |
| 3,888,949 A | 6/1975 | Shih | |
| 5,594,080 A | 1/1997 | Waymouth et al. | |
| 5,723,217 A | 3/1998 | Stahl et al. | |
| 5,726,103 A | 3/1998 | Stahl et al. | |
| 5,736,465 A | 4/1998 | Stahl et al. | |
| 5,763,080 A | 6/1998 | Stahl et al. | |
| 5,891,814 A | 4/1999 | Richeson et al. | |
| 6,010,588 A | 1/2000 | Stahl et al. | |
| 6,342,565 B1 | 1/2002 | Cheng et al. | |
| 2004/0028903 A1 | 2/2004 | Richeson et al. | |
| 2005/0106978 A1 | 5/2005 | Cheng et al. | |
| 2005/0130544 A1 | 6/2005 | Cheng et al. | |
| 2006/0172647 A1* | 8/2006 | Mehta et al. .................. | 442/327 |
| 2008/0172840 A1 | 7/2008 | Kacker et al. | |
| 2008/0199673 A1 | 8/2008 | Allgeuer et al. | |
| 2009/0053959 A1 | 2/2009 | Datta et al. | |

FOREIGN PATENT DOCUMENTS

| | | |
|---|---|---|
| EP | 2 034 057 | 3/2009 |
| WO | WO 99/19547 | 4/1999 |
| WO | WO 2006/065663 | 6/2006 |

(Continued)

OTHER PUBLICATIONS

Chien et al., Isospecific Polymerization of Propylene Catalyzed by rac-Ethylenebis(indenyl)methylzirconium "Cation", J. Am. Chem. Soc., 1991, vol. 113, No. 22, pp. 8570-8571.

De Rosa, C. et al. "*The Double Role of Comonomers on the Crystallization Behavior of Isotactic Polypropylene: Propylene—Hexene Copolymers*", Macromolecules, 41, pp. 2172-2177, 2008.

De Rosa, C. et al. "*Crystallization Behavior of Isotactic Propylene—Ethylene and Propylene—Butene Copolymers: Effect of Comonomers versus Stereodefects on Crystallization Properties of Isotactic Polypropylene*", Macromolecules, 40, pp. 6600-6616, 2007.

Gauthier et al., Elastomeric Poly(propylene): Influence of Catalyst Structure and Polymerization Conditions on Polymer Structure and Properties[1a], Macromolecules, 1995, vol. 28, No. 11, pp. 3771-3778.

(Continued)

*Primary Examiner* — Leo B Tentoni

(57) ABSTRACT

Disclosed herein is a nonwoven fabric comprising within the range of from 1 to 49 wt %, by weight of the fabric, of a reactor grade propylene-α-olefin copolymer possessing; within the range of from 5 to 35 wt %, by weight of the copolymer, of units derived from one or more of ethylene and/or $C_4$ to $C_{12}$ α-olefins; a melt flow rate (230° C./2.16 kg) within the range of from 600 to 7500 g/10 min; and a weight average molecular weight of less than 200,000; and a second polypropylene having a melting point, $T_m$, of greater than 110° C. and a melt flow rate (230° C./2.16 kg) within the range of from 20 to 7500 g/10 min; wherein the fabric has a Handle value of less than 60% (measuring the fabric of 35 g/m² basis weight). The fabric can be used in structures comprising one or more layers of the fabric described herein, and can include any number of other fabric layers made from other materials.

9 Claims, 1 Drawing Sheet

(56) References Cited

FOREIGN PATENT DOCUMENTS

| WO | WO 2007/145713 | 12/2007 |
| WO | WO 2009/026207 | 2/2009 |

OTHER PUBLICATIONS

Hauptman et al., Stereoblock Polypropylene: Ligand Effects on the Stereospecificity of 2-Arylindene Zirconocene Catalysts, J. Am. Chem. Soc., 1995, vol. 117, No. 46, pp. 11586-11587.

Keller, R. C., "*Peroxide Curing of Ethylene-Propylene Elastomers*", Rubber Chemistry and Technology, vol. 61, pp. 238-252.

Kim et al., Modeling Nonheme Diiron Enzymes: Hydrocarbon Hydroxylation and Desaturation by a High-Valent $Fe_2O_2$ Diamond Core, J. Am. Chem. Soc., 1997, vol. 119, No. 15, pp. 3635-3636.

Robson, "*How to read a patent*", Syntheses of Zeolitic Materials, Department of Chemical Engineering, Louisiana State University, Baton Rouge, LA 70803, p. 73, 2001.

Stephens, C. H. et al. "*Comparison of Propylene/Ethylene Copolymers Prepared with Different Catalysts*", Journal of Applied Polymer Science, vol. 100, pp. 1651-1658, 2006.

Total Petrochemicals 3860X and 3962 "*Ultra-high melt flow rate resins for melt blown nonwovens*", Total Petrochemical USA, Inc., Houston, Texas www.totalpetrochemicalsusa.com, Apr. 2010.

www.specialchem4poymers.com, Nov. 2000, Special Chem.

\* cited by examiner

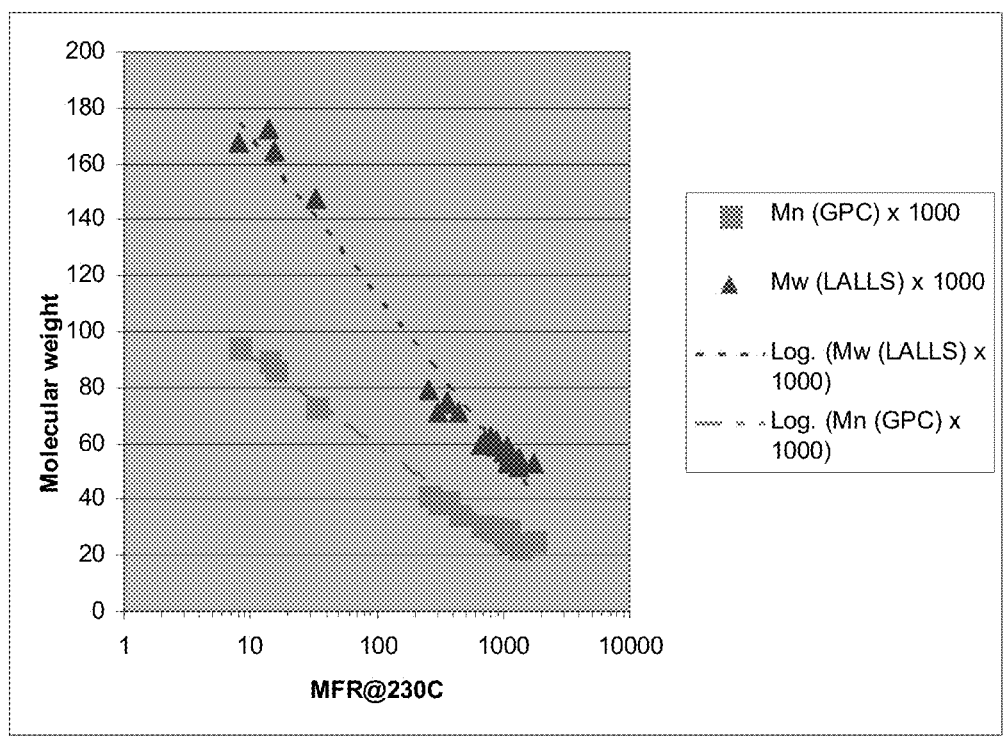
Correlation of molecular weight and MFR for propylene-α-olefins

PROCESS TO PRODUCE SOFT POLYPROPYLENE-BASED NONWOVENS

CROSS-REFERENCE TO RELATED APPLICATION

The present application is a Divisional patent application of U.S. Ser. No. 12/185,491 filed Aug. 4, 2008, now abandoned, and also claims priority to U.S. Ser. No. 12/185,449 filed Aug. 4, 2008, now granted as U.S. Pat. No. 9,018,112, both of which are incorporated herein by reference.

FIELD OF THE INVENTION

The present invention relates in general to soft, extensible fabrics comprising propylene-based polymers, and more particularly relates to propylene-based nonwoven fabrics comprising a propylene-α-olefin copolymer that is a low molecular weight reactor grade polymer suitable for melt blowing.

BACKGROUND

Soft and elastic nonwoven fabrics of polypropylene and its copolymers with α-olefins such as ethylene which lead to substantially softer and more extensible constructions are desirable, yet often difficult to obtain with the right balance of properties. U.S. Pat. Nos. 3,853,969 and 3,378,606, suggest the formation of in situ blends of isotactic polypropylene and "stereo block" copolymers of propylene and another olefin of 2 to 12 carbon atoms, including ethylene and hexene to yield blends which may be fabricated to obtain soft and elastic nonwoven fabrics. Similar results are discussed in U.S. Pat. Nos. 3,262,992, 3,882,197, and 3,888,949, which suggests the synthesis of blend compositions containing isotactic polypropylene and copolymers of propylene and an α-olefin, containing between 6-20 carbon atoms, which are softer and have improved elongation and tensile strength over either the copolymer or isotactic polypropylene. Copolymers of propylene and α-olefin are described wherein the α-olefin is hexene, octene or dodecene.

Examples of propylene homopolymers containing different levels of isotacticity in different portions of the molecule are described in U.S. Pat. No. 5,594,080, in the article in 117 JOURNAL AMERICAN CHEMICAL SOCIETY 11586 (1995), in the article in 119 JOURNAL AMERICAN CHEMICAL SOCIETY 3635 (1997), in the journal article in 113 JOURNAL OF THE AMERICAN CHEMICAL SOCIETY 8569-8570 (1991), and in the journal article in 28 Journal MACROMOLECULES 3771-3778 (1995). U.S. Pat. Nos. 5,723,217, 5,726,103, 5,736,465, 5,763,080, and 6,010,588 suggest several metallocene catalyzed processes to make polypropylene suitable for fibers and fabrics. U.S. Pat. No. 5,891,814, discloses a dual metallocene-generated propylene polymer used to make spunbond fibers. WO 99/19547 discloses a method for producing spunbonded fibers and fabric derived from a blend of a propylene homopolymer and a copolymer of polypropylene. U.S. Pat. No. 6,342,565, U.S. 2005/0130544 A1, and U.S. 2006/0172647 discloses a fiber or nonwoven fabric.

These past disclosures have generally taught that fabricating a nonwoven fabric from a fiber to form a soft or extensible article generally requires the use of a semicrystalline polymer. These semicrystalline polymers are most conveniently made at a high molecular weight (above about 250,000 daltons weight average molecular weight), yet the process of manufacture of the fiber and the fabric, especially meltblown fibers and fabrics, requires a polymer of a lower molecular weight (less than about 250,000 daltons weight average molecular weight). The lower molecular weight is typically achieved by free radical assisted thermal processes ("controlled rheology"). While isotactic polypropylene has been produced at a low enough molecular weight for it to be used without post-reactor degradation, less crystalline polymers containing limited amounts of crystallinity have not been made useful for the fabrication of a fiber and a nonwoven fabric.

SUMMARY

Disclosed herein in one embodiment is a nonwoven fabric comprising within the range of from 1 to 49 wt %, by weight of the fabric, of a reactor grade propylene-α-olefin copolymer possessing; within the range of from 5 to 35 wt %, by weight of the copolymer, of units derived from one or more of ethylene and/or $C_4$ to $C_{12}$ α-olefins; a melt flow rate (230° C./2.16 kg) within the range of from 600 to 7500 g/10 min; and a weight average molecular weight of less than 200,000; and a second polypropylene having a melting point, $T_m$, of greater than 110° C. and a melt flow rate (230° C./2.16 kg) within the range of from 20 to 7500 g/10 min; wherein the fabric has a Handle value of less than 60% (measuring the fabric of 35 g/m² basis weight).

The fabric described herein can be used in structures comprising one or more layers of the fabric described herein, and can include any number of other fabric layers made from other materials.

The various descriptive elements and numerical ranges disclosed herein can be combined with other descriptive elements and numerical ranges to describe preferred embodiments of the invention(s); further, any upper numerical limit of an element can be combined with any lower numerical limit of the same element to describe preferred embodiments.

BRIEF DESCRIPTION OF THE DRAWINGS

FIG. 1 is a graphical representation of the correlation between molecular weight (Mn and Mw) and MFR (230° C., 2.16 kg) for reactor grade propylene-α-olefins as described herein, and commercial grades of Vistamaxx™ polymers of relatively low MFR.

DETAILED DESCRIPTION

Described herein are meltblown fibers and the derived nonwoven fabrics ("fabrics") comprising reactor grade propylene-α-olefin copolymer wherein the fabric has a Handle value of less than 60% (measuring the fabric of 35 g/m² basis weight). The fabrics can be made by any conventional means known in the art, but are preferably produced by a meltblown process. The meltblown process used is not particularly limited, as long as the desirable softness, as expressed by the "Handle," is maintained. Further, the elasticity of the fabric can be adjusted by any combination (within the limits of the description herein) of the amounts and/or identity of the components used to make the fabric. In certain embodiments, the fabrics comprise—consist essentially of in a particular embodiment—a reactor grade propylene-α-olefin copolymer and a "second" polypropylene, both of which are described in more detail below. By "consists essentially of," what is meant is that there are no other additive(s) in the fabrics that are present to greater than a total of 5 wt %, based on the weight of the fabric.

As used herein, "fabric" is a structure (preferably flat) that has a thickness such that it impedes, but does not stop, the passage of air and/or water, the fabric made from fibers that are bound together through chemical bonding, melt adhesion or weaving such that they form the fabric.

Reactor Grade Propylene-α-Olefin Copolymer ("RGP")

The "reactor grade propylene-α-olefin copolymer" described herein is a reactor grade copolymer, meaning that it has not been subjected to any post polymerization chemical process such as chain scissioning, grafting, etc., that will alter its weight average molecular weight by any more than 2%. The "reactor grade propylene-α-olefin copolymers" ("RGP") used in the fibers and fabrics described herein are crystallizable copolymers of propylene and at least one of ethylene and/or a $C_4$ or higher α-olefin, ethylene in a particular embodiment. A "crystallizable" polymer—distinct from a "crystalline" polymer—is a polymer where the measured crystallinity of the polymer as measured by the heat of fusion (by DSC, as described in the procedure below) is augmented at least by a factor of 1.5, or 2, or 3 by either waiting for a period of 120 hours at room temperature, by singly or repeatedly mechanical distending the sample, or by contact with another crystalline polymer such as isotactic polypropylene. Certain aspects of the fabrics described herein relate to the inclusion of a low molecular weight (weight average molecular weight of less than 200,000 daltons) reactor grade propylene α-olefin copolymer which has some or all of the below features.

In certain embodiments, the reactor grade propylene-α-olefin copolymer is prepared by reacting propylene, an ethylene and/or another α-olefin (preferably ethylene) and a single site catalyst composition, preferably a metallocene catalyst composition. Preferably, chain scissioning byproducts, as are known in the art, are substantially absent from the reactor grade propylene-α-olefin copolymer, meaning that if such byproducts are present, they are only present to less than 1 wt %, by weight of the copolymer.

The "RGPs" described herein are copolymers of propylene-derived units and one or more units derived from ethylene and/or a $C_4$-$C_{12}$ α-olefin. The overall comonomer content of the copolymer is within the range of from 5 to 35 wt % by weight of the RGP. In general, the comonomer content and the conditions for producing the RGP are adjusted so that the RGP has a molecular weight distribution (Mw/Mn) within the range of from 1.5 to 20, a heat of fusion ($\Delta H_f$) of from less than or equal to 75 J/g, and a peak melting temperature ($T_m$) within the range of from 0° C. to 100° C. In some embodiments, where more than one comonomer is present, the amount of a particular comonomer may be less than 5 wt %, but the combined comonomer content is preferably greater than 5 wt %. The RGPs may be described by any number of different parameters, and those parameters may comprise a numerical range made up of any desirable upper limit with any desirable lower limit as described herein for the RGPs.

In certain embodiments, when there is more than one α-olefin-derived unit in the copolymer, the total weight percent of the ethylene and/or $C_4$-$C_{10}$ α-olefin-derived units (or "α-olefin") is within the range of from 5 to 35 wt %, and from 7 to 32 wt % in another embodiment, and from 8 to 25 wt % in yet another embodiment, and from 8 to 20 wt % in yet another embodiment, and from 8 to 18 wt % in a particular embodiment. Non-limiting examples of copolymers, or "terpolymers," having more than one α-olefin include propylene-ethylene-octene, propylene-ethylene-hexene and propylene-ethylene-butene polymers. In a particular embodiment, the RGP comprises propylene-derived units and comonomer units selected from ethylene, 1-butene, 1-hexene and 1-octene, and preferably ethylene. Thus the RGP is preferably a propylene-ethylene copolymer.

In certain embodiments, the RGPs have a triad "mm" tacticity of three propylene units, as measured by $^{13}C$ NMR, of 75% or greater, 80% or greater, 82% or greater, 85% or greater, or 90% or greater. In one embodiment, the triad "mm" tacticity is within the range of from 50 to 99%, and from 60 to 99% in another embodiment, and from 75 to 99% in yet another embodiment, and from 80 to 99% in yet another embodiment; and from 60 to 97% in yet another embodiment. Triad tacticity is determined by calculation of the peak areas PPP(mm), PPP(mr) and PPP(rr) derived from the methyl groups of the second units in the following three propylene unit chains consisting of head-to-tail bonds. The $^{13}C$ NMR spectrum of the propylene copolymer is measured as described in U.S. Pat. No. 5,504,172. The spectrum relating to the methyl carbon region (19-23 parts per million (ppm)) can be divided into a first region (21.2-21.9 ppm), a second region (20.3-21.0 ppm) and a third region (19.5-20.3 ppm). Each peak in the spectrum was assigned with reference to 30 POLYMER 1350 (1989). In the first region, the methyl group of the second unit in the three propylene unit chain represented by PPP (mm) resonates. In the second region, the methyl group of the second unit in the three propylene unit chain represented by PPP(mr) resonates, and the methyl group (PPE-methyl group) of a propylene unit whose adjacent units are a propylene unit and an ethylene unit resonates (in the vicinity of 20.7 ppm). In the third region, the methyl group of the second unit in the three propylene unit chain represented by PPP(rr) resonates, and the methyl group (EPE-methyl group) of a propylene unit whose adjacent units are ethylene units resonates (in the vicinity of 19.8 ppm). The calculation of the triad tacticity is outlined in the techniques shown in U.S. Pat. No. 5,504,172. Subtraction of the peak areas for the error in propylene insertions (both 2,1 and 1,3) from peak areas from the total peak areas of the second region and the third region, the peak areas based on the 3 propylene units-chains (PPP(mr) and PPP(rr)) consisting of head-to-tail bonds can be obtained. Thus, the peak areas of PPP(mm), PPP(mr) and PPP(rr) can be evaluated, and hence the triad tacticity of the propylene unit chain consisting of head-to-tail bonds can be determined.

An alternate mode of expressing the stereoregularity of the propylene insertion is by the tacticity index. The insertion of propylene can occur by either 2,1 (tail-to-tail) or 1,3 insertions (end-to-end). Such determination is outlined in U.S. Pat. No. 5,504,172. The proportion of the 2,1-insertions to all of the propylene insertions in the RGPs was calculated by the following formula with reference to 30 POLYMER 1350 (1989): Proportion of inversely inserted unit based on 2,1-insertion (%)=100×[0.25 $I_{\alpha\beta}$(structure (i))+0.5$I_{\alpha\beta}$(structure(ii))]/ [$I_{\alpha\alpha}$+$I_{\alpha\beta}$(structure (ii))+0.5($I_{\alpha\gamma}$+$I_{\alpha\beta}$(structure(i))+$I_{\alpha\delta}$)]. Naming of the peaks in this formula was done in accordance with a method of Carman, et al. in 44 RUBBER CHEMISTRY AND TECHNOLOGY 781 (1971), where $I_{\alpha\delta}$ denotes a peak area of the $\alpha\delta^+$ secondary carbon peak. It is difficult to separate the peak area of $I_{\alpha\beta}$ (structure (i)) from $I_{\alpha\beta}$ (structure (ii)) because of overlapping of the peaks. Carbon peaks having the corresponding areas can be substituted therefore.

The measurement of the 1,3 insertion requires the measurement of the βγ peak. Two structures can contribute to the βγ peak: (1) a 1,3-insertion of a propylene monomer; and (2) from a 2,1-insertion of a propylene monomer followed by two ethylene monomers. This peak is described as the 1.3 insertion peak and the procedure described in U.S. Pat. No. 5,504, 172 is used, which describes this βγ peak and is understood to represent a sequence of four methylene units. The proportion (%) of the amount of these errors was determined by dividing the area of the βγ peak (resonance in the vicinity of 27.4 ppm)

by the sum of all the methyl group peaks and ½ of the area of the βγ peak, and then multiplying the resulting value by 100. If an α-olefin of three or more carbon atoms is polymerized using an olefin polymerization catalyst, a number of inversely inserted monomer units are present in the molecules of the resultant olefin polymer. In polyolefins prepared by polymerization of α-olefins of three or more carbon atoms in the presence of a chiral metallocene catalyst, 2,1-insertion or 1,3-insertion takes place in addition to the usual 1,2-insertion, such that inversely inserted units such as a 2,1-insertion or a 1,3-insertion are formed in the olefin polymer molecule (see, K Soga, T Shiono, S. Takemura and W. Kaminski in 8 MACROMOLECULAR CHEMISTRY RAPID COMMUNICATION 305 (1987)). In certain embodiments, the RGPs have a proportion of inversely inserted propylene units, based on the 2,1-insertion of a propylene monomer in all propylene insertions as measured by $^{13}$C NMR, is greater than 0.5%, or greater than 0.6%. In certain embodiments, the RGPs have a proportion of inversely inserted propylene units, based on the 1,3-insertion of a propylene monomer, as measured by $^{13}$C NMR is greater than 0.05%, or greater than 0.06%, or greater than 0.07%, or greater than 0.08%, or greater than 0.085%.

In certain embodiments, the RGPs have a heat of fusion ($\Delta H_f$), determined according to the Differential Scanning Calorimetry (DSC) procedure described herein, within the range of from 0.5 or 1 or 5 J/g to 30 or 35 or 40 or 50 or 60 or 75 J/g. In certain embodiments, the RGPs have a percent crystallinity within the range of from 0.25 or 0.5 or 1 or 2 to 25 or 30 or 40%. The crystallinity is calculated based on the assumption that the thermal energy for the highest order of polypropylene is estimated at 189 J/g (i.e., 100% crystallinity is equal to $\Delta H_f$ of 189 J/g). In yet other embodiments, the RGPs have a crystallization temperature (TO within the range of from 0 or 5 to 15 or 20 or 30 or 40° C.

In certain embodiments, the RGPs have a single peak melting transition as determined by DSC; in certain embodiments the RGP has a primary peak melting transition at from less than 90° C., with a broad end-of-melt transition at greater than about 110° C. The peak "melting point" ($T_m$) is defined as the temperature of the greatest heat absorption within the range of melting of the sample. However, the RGP may show secondary melting peaks adjacent to the principal peak, and or the end-of-melt transition, but for purposes herein, such secondary melting peaks are considered together as a single melting point, with the highest of these peaks being considered the $T_m$ of the RGP. In certain embodiments, the RGPs have a peak melting temperature ($T_m$) within the range of from 0 or 5 or 10 or 20 or 25° C. to 65 or 70 or 80 or 100° C., and a $T_m$ of less than 80 or 100° C. in other embodiments.

In certain embodiments, the RGPs have a density within the range of from 0.850 to 0.920 g/cm$^3$, and from 0.870 to 0.900 g/cm$^3$ in another embodiment, and from 0.880 to 0.890 g/cm$^3$ in yet another embodiment, the values measured at room temperature per the ASTM D-1505 test method.

In certain embodiments, the RGPs have a melt flow rate ("MFR" ASTM D1238, 2.16 kg, 230° C. as used throughout) of greater than 500 or 800 or 1000 or 1200 g/10 min; and the MFR for the RGPs is within the range of from 500 or 800 or 1000 g/10 min to 3000 or 3500 or 4000 or 5000 or 6000 g/10 min in other embodiments.

In certain embodiments, the RGPs have a weight average molecular weight (Mw) value within the range of from 5,000 or 10,000 or 20,000 or 30,000 to 70,000 or 80,000 or 100,000 or 150,000 or 200,000 daltons; and less than 200,000 or 150,000 or 100,000 or 80,000 daltons in other embodiments. In certain embodiments, the RGPs have a number average molecular weight (Mn) value within the range of from 10,000 or 15,000 to 40,000 or 50,000 or 80,000 or 100,000 daltons; and less than 80,000 or 50,000 in other embodiments. In certain embodiments, the molecular weight distribution (MWD) of the RGPs is within the range of from 1.5 or 1.8 or 2 to 3.5 or 4 or 5 or 10 or 20. Techniques for determining the molecular weight (Mn, Mz and Mw) and MWD are as in Verstate et al. in 21 MACROMOLECULES 3360 (1988) and as described below. Conditions described herein govern over published test conditions.

Although the "reactor grade propylene-α-olefin" component of the fibers and fabrics described herein have been discussed as a single polymer, the term "RGP" includes blends of two or more RGPs, preferably, having the properties described herein, are also contemplated.

The RGPs can be prepared in a single stage, steady state polymerization process conducted in a well-mixed continuous feed polymerization reactor. The polymerization can be conducted in solution, although other polymerization procedures such as gas phase or slurry polymerization, which fulfill the requirements of single stage polymerization and continuous feed reactors, may also be used. The RGPs can be prepared by polymerizing a mixture of propylene and one or more other α-olefins in the presence of a chiral catalyst (preferably a chiral metallocene), wherein a copolymer is obtained comprising up to 35% by weight ethylene and/or higher α-olefins and preferably up to 20% by weight ethylene and/or higher α-olefins containing isotactically crystallizable propylene sequences, in a single stage or multiple stage reactor. Generally, without limiting in any way the scope described herein, one process for the production of the RGP is as follows: (1) liquid propylene is introduced in a stirred-tank reactor which is completely or partly full of liquid comprising the solvent, the propylene copolymers as well as dissolved, unreacted monomer(s) and catalyst components, (2) the catalyst system is introduced via nozzles in either the vapor or liquid phase, (3) feed ethylene gas and any higher α-olefins are introduced either into the vapor phase of the reactor into the liquid phase as is well known in the art, (4) the reactor contains a liquid phase composed substantially of propylene, together with dissolved ethylene and/or higher α olefin, and a vapor phase containing vapors of all monomers, (5) the reactor temperature and pressure may be controlled via reflux of vaporizing propylene (autorefrigeration), as well as by cooling coils, jackets, etc., (6) the polymerization rate is controlled by the concentration of catalyst, temperature, and (7) the ethylene and/or higher α-olefin content of the polymer product is determined by the ratio of ethylene and/or higher α-olefin to propylene in the reactor, which is controlled by manipulating the relative feed rates of these components to the reactor; and the molecular weight (and melt flow rate) is controlled in party by addition of chain terminating agents such as hydrogen and/or control of the temperature, where a higher temperature tends to decrease the molecular weight.

A typical polymerization process consists of a polymerization in the presence of a catalyst comprising a chiral bis (cyclopentadienyl) Group 4 metal (preferably hafnium) compound, a bridged Group 4 metallocene in a particular embodiment, and either: (1) a non-coordinating compatible anion activator or (2) an alumoxane activator. An exemplary catalyst system is described in U.S. Pat. No. 5,198,401, incorporated herein by reference. The alumoxane activator is preferably utilized in an amount to provide a molar aluminum-to-metallocene ratio of from 1:1 to 20,000:1 or more. The non-coordinating compatible anion activator is preferably utilized in an amount to provide a molar ratio of biscyclopentadienyl metal compound to non-coordinating anion of 10:1 to 2:3. The above polymerization reaction is conducted by reacting such monomers in the presence of such catalyst system at a temperature within the range of from −50 or 0 or 10 or 50 or 80 or 90° C. to 120 or 150 or 200° C.; and in certain embodiments for a time of from about 1 second to about 10 hours to produce a copolymer or terpolymer having the characteristics described herein.

Descriptions of useful ionic catalysts for polymerization of olefins using metallocene cations activated by non-coordinating anions appear in U.S. Pat. Nos. 5,198,401 and 5,278,119, and WO 92/00333. These references suggest a method of preparation wherein metallocenes (bis Cp and mono Cp) are protonated by anionic precursors such that an alkyl/hydride group is abstracted from a transition metal to make it both cationic and charge-balanced by the non-coordinating anion. The use of ionizing ionic compounds not containing an active proton but capable of producing both the active metallocene cation and a non-coordinating anion are also useful herein. Reactive cations other than Bronsted acids capable of ionizing the metallocene compounds include ferrocenium, triphenylcarbonium, and triethylsilylium cations. Any metal or metalloid capable of forming a coordination complex which is resistant to degradation by water (or other Bronsted or Lewis acids) may be used or contained in the anion of the second activator compound. Suitable metals include, but are not limited to, aluminum, gold, platinum and the like. Suitable metalloids include, but are not limited to, boron, phosphorus, silicon and the like.

An additional method of making the ionic catalysts uses ionizing anionic precursors which are initially neutral Lewis acids but form the cation and anion upon ionizing reaction with the metallocene compounds. For example tris(pentafluorophenyl) boron acts to abstract an alkyl, hydride or silyl ligand to yield a metallocene cation and stabilizing non-coordinating anion. Ionic catalysts useful herein for addition polymerization can also be prepared by oxidation of the metal centers of transition metal compounds by anionic precursors containing metallic oxidizing groups along with the anion groups.

In certain embodiments, a process for preparing blend compositions (that include at least the RGP and SPP) comprises the steps of: (a) polymerizing a mixture of ethylene and propylene in the presence of a chiral metallocene catalyst to obtain a copolymer comprising from about 65% to about 95% propylene by weight of the copolymer having an MFR greater than 500 dg/min; (b) providing a polypropylene that is a substantially isotactic propylene copolymer comprising from, for example, from 91% to 99.5% propylene by weight of the isotactic propylene copolymer and/or having a melting point by DSC of greater than 110° C.; and (c) blending the propylene polymer of step (a) with the copolymer of step (b); and blending at step (c), or after, optional additives. The polypropylene of (b), the "second polypropylene," may be provided as having a desirably high MFR, such as greater than 500 g/10 min, or can be provided as a polypropylene of relatively low MFR, which in certain embodiments can be followed by the additional step of performing controlled rheology using a chain scissioning agent such as an organic peroxide, as is well known in the art.

To produce the soft, elastic fibers and fabrics described herein, the one or more RGPs are blended by any suitable means with at least one "second polypropylene." In such a blend (or "composition"), the RGP is present within the range of from 1 or 5 or 10 or 15 to 40 or 45 or 49 wt %, by weight of the composition in one embodiment, and by weight of the fabric in another embodiment. The fabric/composition may also include other additives such as slip agents, oils, plasticizers, antioxidants and other additives that are known in the art as long as a 35 g/m$^2$ basis weight fabric comprising the one or more RGPs maintains a CD Elongation value (as described herein) of greater than 50%.

Second Polypropylene ("SPP")

The "second polypropylene" component is a crystalline polypropylene polymer component that may be homopolypropylene, a copolymer comprising propylene, or some mixture thereof. The second polypropylene comprises from 51 or 55 or 60 to 85 or 90 or 95 or 99 wt % of the fabric. In certain embodiments, the second polypropylene has one or more of the following characteristics (A)-(D):

(A) The second polypropylene is predominately crystalline and has a melting point of greater than 110° C., preferably greater than 115° C., and most preferably greater than 130° C. The second polypropylene may also have a heat of fusion greater than 25 J/g or 30 J/g or 40 J/g or 50 J/g 60 J/g or 70 J/g or 80 J/g in certain embodiments as determined by DSC analysis, and within the range of from 25 or 30 or 40 J/g to 70 or 80 or 90 or 100 or 120 or 150 or 160 J/g in other embodiments as determined by DSC.

(B) The polypropylene can vary widely in composition. For example, substantially isotactic polypropylene homopolymers or propylene copolymers containing equal to or less than 10 weight percent of other monomer, i.e., at least 90% by weight propylene derived units can be used. Further, the polypropylene can be present in the form of a graft or block copolymer, in which the blocks of polypropylene have substantially the same stereoregularity as the propylene-α-olefin copolymer so long as the graft or block copolymer has a sharp melting point above 110° C. and preferably above 115° C. and more preferably above 130° C., characteristic of the stereoregular propylene sequences. The propylene polymer component may be a combination of homopolypropylene, and/or random and/or block copolymers as described herein. When the above propylene polymer component is a random copolymer, the percentage of the copolymerized α-olefin in the copolymer is up to 9% by weight, preferably 2%-8% by weight, most preferably 2%-6% by weight. The preferred α-olefins contain 2 or from 4 to 12 carbon atoms. The most preferred α-olefin is ethylene. One, two or more α-olefins can be copolymerized with propylene to form the SPP. Exemplary α-olefins may be selected from the group consisting of ethylene; 1-butene; 1-pentene, 2-methyl-1-pentene, 3-methyl-1-butene; 1-hexene, 3-methyl-1-pentene, 4-methyl-1-pentene, 3,3-dimethyl-1-butene; 1-heptene; 1-hexene; 1-methylhexene; dimethyl-1-pentene, trimethyl-1-butene; ethyl-1-pentene; 1-octene; methyl-1-pentene; dimethyl-1-hexene; trimethyl-1-pentene; ethyl-1-hexene; methylethyl-1-pentene; diethyl-1-butene; propyl-1-pentane; 1-decene; methyl-1-nonene; 1-nonene; dimethyl-1-octene; trimethyl-1-heptene; ethyl-1-octene; methyl-1-ethylbutene; diethyl-1-hexene; 1-dodecene and 1-hexadodecene.

(C) The molecular weight of the second polypropylene can be within the range of from 10,000 or 50,000 or 80,000 to 500,000 or 800,000 or 1,000,000 or 2,000,000, with a polydispersity index (PDI, or molecular weight distribution, Mw/Mn) within the range of from 1.5 to 2.5 or 3.0 or 4.0 or 20 or 40.0.

(D) The MFR (2.16 kg, 230° C.) of the second polypropylene, either as a reactor grade (same meaning as above for the RGP) or a controlled-rheology polypropylene, is within the range of from 20 or 100 or 200 or 300 or 500 or 600 to 1000 or 1500 or 2000 or 3000 or 5000 or 7500 g/10 min.

There is no particular limitation on the method for preparing the second polypropylene. However, in general, the polymer is a propylene homopolymer obtained by homopolymerization of propylene in a single stage or multiple stage reactors. Copolymers may be obtained by copolymerizing propylene and ethylene and/or an α-olefin having from 4 to 20 carbon atoms, preferably ethylene, in a single stage or multiple stage reactor by any suitable means.

The second polypropylene can be either homopolymer or a copolymer with other α-olefins. The second polypropylene may also be comprised of commonly available isotactic polypropylene compositions referred to as impact copolymer or reactor copolymer. However these variations in the identity of the second polypropylene are acceptable only to the extent that all of the components of the second polypropylene are substantially similar in composition and the second polypropylene is within the limitations of the crystallinity and melting point indicated above. This second polypropylene may also contain additives such as flow improvers, nucleators and antioxidants which are normally added to isotactic polypropylene to improve or retain its properties. All of these polymers, alone or in a blend, may be referred to as the "second polypropylene."

Exemplary commercial products suitable for use as the second polypropylene include the family of Escorene™ and Achieve™ brand polypropylenes (ExxonMobil Chemical Co.), and Metocene™ brand polypropylenes (Lyondell-Basell). The Achieve polymers are produced using metallocene catalyst systems. In certain embodiments, the metallocene catalyst system produces a narrow molecular weight distribution polymer. The molecular weight distribution (MWD) as measured by weight averaged molecular weight (Mw)/number averaged molecular weight (Mn) is typically in the range of 1.5 to 2.5 or 3.0 or 4.0 or 5.0. However, a broader MWD polymer may be produced in a process with multiple reactors. Different molecular weight polymers can be produced in each reactor to broaden the MWD. Achieve polymer such as Achieve 3854 polypropylene, a 24 g/10 min MFR homopolymer can be used as the second polypropylene. Alternatively, Achieve polymer such as Achieve 6936G1 polypropylene, a 1500 MFR homopolymer can be used as the second polypropylene. Polypropylene homopolymer, random copolymer and impact copolymer produced by Ziegler-Natta catalyst system have a relatively broad MWD (within the range of from 3.0 to 6.0). The resin can be modified by a process called controlled rheology to reduce the MWD to improve spinning performance. Example of such product is PP3155, a 36 g/10 min MFR homopolymer (ExxonMobil Chemical Co.).

Additives

As mentioned above, a variety of additives may be incorporated into the embodiments described above used to make the fibers and fabric for various purposes. Such additives include, for example, stabilizers, surfactants, antioxidants, fillers, colorants, nucleating agents, anti-block agents and slip additives. Primary and secondary antioxidants include, for example, hindered phenols, hindered amines, and phosphates. Nucleating agents include, for example, sodium benzoate and talc, and highly crystalline propylene polymers. Other additives such as dispersing agents, for example, Acrowax™ C, can also be included. Slip agents include, for example, oleamide and erucamide. Catalyst deactivators are also commonly used, for example, calcium stearate, hydrotalcite, and calcium oxide, and/or other acid neutralizers known in the art. Additives such as these may be present in the fibers, fabrics and/or compositions within the range of from 0.1 or 0.5 to 2 or 3 or 5 wt %, as long as the elasticity of the fabrics made therefrom maintain the desired elasticity (CD Elongation) and softness (Handle).

Other additives include, for example, fire/flame retardants, plasticizers, vulcanizing or curative agents, vulcanizing or curative accelerators, cure retarders, processing aids, tackifying resins, process oils (synthetic and/or natural) and the like. The aforementioned additives of may also include fillers and/or reinforcing materials, either added independently or incorporated into an additive. Examples include carbon black, clay, talc, calcium carbonate, mica, silica, silicate, combinations thereof, and the like.

Of course, the particular additive can be selected as desired to impart or improve specific surface characteristics of the composition and thereby modify the properties of the fabric made therefrom. A variety of active agents or chemical compounds have heretofore been utilized to impart or improve various surface properties including, but not limited to, absorbency, wettability, anti-static properties, anti-microbial properties, anti-fungal properties, liquid repellency (e.g. alcohol or water) and so forth. As an example, exemplary wetting agents that can be melt-processed in order to impart improved wettability to the fiber include, but are not limited to, ethoxylated silicone surfactants, ethoxylated hydrocarbon surfactants, ethoxylated fluorocarbon surfactants and so forth.

Formation of Polymer Composition and the Fabrics Therefrom

The blends ("compositions") of the second polypropylene and RGP, and other optional additives may be prepared by any procedure that results in an intimate mixture of the components. For example, the components can be combined by melt pressing the components together on a Carver press to a thickness of 0.5 millimeter (20 mils) and a temperature of about 180° C., rolling Lip the resulting slab, folding the ends together and repeating the pressing, rolling, and folding operation 10 times. Internal mixers are particularly useful for solution or melt blending. Blending at a temperature of 180° C. to 240° C. in a Brabender Plastograph for 1 to 20 minutes has been found satisfactory. Still another method that may be used for admixing the components involves blending the polymers in a Banbury internal mixer above the flux temperature of all of the components, for example, 180° C. for 5 minutes. A complete mixture of the polymeric components is indicated by the uniformity of the morphology of the dispersion of second polypropylene and RGP. Continuous mixing may also be used. These processes are well known in the art and include single and twin screw mixing extruders, static mixers for mixing molten polymer streams of low viscosity, impingement mixers, as well as other machines and processes, designed to disperse the RGP and the second polypropylene in intimate contact. A particularly desirable mode of admixture would be the melt mixing of molten pellets of RGP and the second polypropylene in the desired weight ratio within the confines of the extruder feeding the spinnerets for the formation of melt blown fibers.

The compositions described herein exhibit a remarkable combination of desirable physical properties. The incorporation of as little as 5 wt % of the second polypropylene with the RGP increases the melting point of the blend. In addition, the incorporation of the second polypropylene eliminates the stickiness characteristic of the RGP alone in certain embodiments. In certain embodiments, the composition consists essentially of the RGP and second polypropylene; and in further embodiments, the fibers and fabrics produced from the compositions consist essentially of the RGP and second polypropylene.

The formation of nonwoven fabrics from polyolefins and their blends generally requires the manufacture of fibers by extrusion followed by weaving or bonding. The extrusion process is typically accompanied by mechanical or aerodynamic drawing of the fibers. The elastic fabrics described herein may be manufactured by any technique known in the art. Such methods and equipment are well known.

Meltblown fibers are fibers formed by extruding a molten thermoplastic material through a plurality of fine, usually circular, die capillaries as molten threads or filaments into converging, usually hot and high velocity, gas streams (e.g., air or nitrogen) to attenuate the filaments of molten thermoplastic material and form fibers. During the meltblowing process, the diameter of the molten filaments is reduced by the drawing air to a desired size. Thereafter, the meltblown fibers are carried by the high velocity gas stream and are deposited on a collecting surface to form at least one web of randomly disbursed meltblown fibers. Meltblown fibers may be continuous or discontinuous and are generally smaller than 10 microns in average diameter.

In a conventional meltblowing process, molten polymer is provided to a die that is disposed between a pair of air plates that form a primary air nozzle. Standard meltblown equipment includes a die tip with a single row of capillaries along a knife edge. Exemplary die tips have approximately 30 capillary exit holes per linear inch of die width. The die tip is typically a 60° wedge-shaped block converging at the knife edge at the point where the capillaries are located. The air plates in many known meltblowing nozzles are mounted in a recessed configuration such that the tip of the die is set back from the primary air nozzle. However, air plates in some nozzles are mounted in a flush configuration where the air plate ends are in the same horizontal plane as the die tip; in other nozzles the die tip is in a protruding or "stick-out" configuration so that the tip of the die extends past the ends of the air plates. Moreover, more than one air flow stream can be provided for use in the nozzle.

In some known configurations of meltblowing nozzles, hot air is provided through the primary air nozzle formed on each side of the die tip. The hot air heats the die and thus prevents the die from freezing as the molten polymer exits and cools. In this way the die is prevented from becoming clogged with solidifying polymer. The hot air also draws, or attenuates, the melt into fibers. Other schemes for preventing freezing of the die, such as that detailed in U.S. Pat. No. 5,196,207, using heated gas to maintain polymer temperature in the reservoir, is also known. Secondary, or quenching, air at temperatures above ambient is known to be provided through the die head. Primary hot air flow rates typically range from about 20 to 24 standard cubic feet per minute per inch of die width (SCFM/inch).

In certain embodiments the primary air pressure in the meltblown process typically ranges from 2 or 5 to 8 or 10 or 15 pounds per square inch gauge (psig) at a point in the die head just prior to exit. Primary air temperature typically ranges from 200 or 230 to 300 or 320 or 350° C. in certain embodiments, but temperatures of 400° C. are not uncommon. The particular temperature of the primary hot air flow will depend on the particular polymer being drawn as well as other characteristics desired in the meltblown web. The melt temperature of the compositions used to make the fabrics described herein are at least that to form a melt of the composition and below the decomposition temperature of the components of the blend, and in certain embodiments is within the range of from 200 or 220° C. to 280 or 300° C. Expressed in terms of the amount of composition flowing per inch of the die per unit of time, throughputs for the manufacture of fabrics using the compositions described herein are typically within the range of from 0.1 or 0.2 or 0.3 to 1 or 1.25 grams per hole per minute (ghm). Thus, for a die having 30 holes per inch, polymer throughput is typically about 2 to 5 or 7 or 8 lbs/inch/hour (PIH). In certain embodiments, the composition is meltblown at a melt temperature within the range of from 220 or 240 to 280 or 300° C. and a throughput within the range of from 0.1 or 0.2 to 1.25 or 2.0 g/hole/min.

Because such high temperatures must be used, a substantial amount of heat is typically removed from the fibers in order to quench, or solidify, the fibers leaving the die orifice. Cold gases, such as air, have been used to accelerate cooling and solidification of the meltblown fibers. In particular, secondary air flowing in a cross-flow perpendicular, or 90°, direction relative to the direction of fiber elongation, may be used to quench meltblown fibers and produce smaller diameter fibers. In addition, a cooler pressurized quench air may be used and can result in faster cooling and solidification of the fibers. A cold air flow may be used to attenuate the fibers when it is desired to decrease the attenuation of the fibers. Through the control of air and die tip temperatures, air pressure, and polymer feed rate, the diameter of the fiber formed during the meltblown process may be regulated. In certain embodiments, meltblown fibers produced herein have a diameter of 0.5 or 1.0 or 2 to 3 or 4 or 5 microns.

After cooling, in certain embodiments the fibers are collected to form a nonwoven web. In particular, the fibers are collected on a forming web that comprises a moving mesh screen or belt located below the die tip. In order to provide enough space beneath the die tip for fiber forming, attenuation and cooling, forming distances of at least about 8 to 12 inches between the polymer die tip and the top of the mesh screen are required in the typical meltblowing process. However, forming distances as low as 4 inches are possible. The shorter forming distances may be achieved with attenuating air flows of at least 30° C. cooler than the temperature of the molten polymer. In certain embodiments, the fabric is formed directly upon another fabric, a spunbond fabric in a particular embodiment.

In certain embodiments, the mechanical properties of the fabrics described herein can be enhanced by the annealing the polymer fiber or other post fabrication processing. Annealing is often combined with mechanical orientation, in either or both the transverse direction (CD) or the machine direction (MD). It is preferred to employ an annealing step in the process with or without mechanical orientation. Annealing may also be done after fabrication of a non-woven material from the fibers. In certain embodiments, the fiber or fabric is annealed at a temperature within the range of from 50 or 60 to 130 or 160° C. Thermal annealing of the polymer blend is conducted by maintaining the composition or fabric at a temperature within the range above for a period of from 1 second to 1 minute, preferably between 1 and 10 seconds. The annealing time and temperature can be adjusted for any particular blend composition comprising a second polypropylene and one or two RGP by experimentation. Mechanical orientation can be done by the temporary, forced extension of the polymer fiber for a short period of time before it is allowed to relax in the absence of the extensional forces. In another embodiment, the elastic fabrics described herein are annealed in a single-step by a heated roll (godet) during calendaring under low tension. In other embodiments, the elastic nonwoven fabrics described herein require little to no post fabrication processing.

It has been surprisingly found that the composition of the RGP, second polypropylene and other optional additives can be easily meltblown into fibers by extrusion through a spinneret followed by drawing, to the desired denier. Additionally it has been found that the ability to spin fibers of these blends, as measured by the rate of spinning, is unaffected across a wide composition range. The relative amounts of the RGP in the composition as well as its particular properties are tailored to meet the desired end characteristics of the fabric. The general trends shown in Table 1 demonstrate the versatility of the compositions herein.

The fabrics described herein possess a number of desirable attributes that can be tailored by adjusting the identity of either or both the RGP and second polypropylene as well as the amount of one or both. The fabrics described herein are characterized by having a CD Elongation value of greater than 50%, as measured in the fabric of 35 g/m² basis weight. The basis weight of the fabrics described herein is not limited and can be within the range of from, for example, 5 to 200 g/m² basis weight. The use of the specific "35 g/m² basis weight" is in reference to the basis weight of the fabric that is measured for, for example, its CD Elongation value. Thus, the fabrics (measuring the fabric of 35 g/m² basis weight) may be further described by any combination of other features such as:

In certain embodiments, the fabric has an MD Elongation value within the range of from 2 or 5 to 30 or 40%.
In certain embodiments, the fabric has a CD Elongation value within the range of from 5 or 10 to 50 or 60%, and from less than 50 or 60% in other embodiments.
In certain embodiments, the fabric has a Hydrostatic Head value of greater than 50 or 60 mbar, or within the range of from 20 or 30 to 90 or 100 mbar.
In certain embodiments, the fabric has an Air Permeability value of greater than 30 or 40 ft³/ft²/min, and within the range of from 20 or 30 to 90 or 100 ft³/ft²/min.
In certain embodiments, the fabric has a Handle value within the range of from 5 or 10 to 40 or 50 or 60 g, or less than 60 or 50 or 40 grams in another embodiment.

TABLE 1

Dependence of Fabric property on nonwoven process conditions and composition variables

| Composition variable | | Process/Annealing conditions | | | | Result | |
|---|---|---|---|---|---|---|---|
| RGP wt % | SPP wt % | Calendar Temp. | Process Temp. | Line Speed | Take up Tension | MD elasticity | CD elasticity |
| higher | lower | same | same | same | same | high | high |
| lower | higher | same | same | same | same | low | low |
| same | same | higher | same | same | same | high | high |
| same | same | lower | same | same | same | low | low |
| same | same | same | higher | same | same | weak | weak |
| same | same | same | lower | same | same | weak | weak |
| same | same | same | same | higher | — | low | high |
| same | same | same | same | lower | same | high | low |
| same | same | same | same | same | higher | low | high |
| same | same | same | same | same | lower | high | lower |

The fabrics described herein may comprise part of a structure such as a multilayer laminate. As used herein, "multilayer laminate" refers to a laminate that includes two or more layers of fabric, at least one of which is the fabric described herein. In certain embodiments, the structure is a multilayer laminate wherein some of the layers are spunbond and some are meltblown such as spunbond/meltblown/spunbond ("SMS") laminates and spunbond/meltblown/meltblown/spunbond ("SMMS") laminates. For example, elastic fabrics described herein may be used in the manufacture of hygiene products. Examples include diapers (child and adult) and feminine hygiene products. The elastic fabrics described herein are also useful for medical products. Examples include medical fabric for gowns, linens, towels, bandages, instrument wraps, scrubs, masks, head wraps, and drapes. Additionally, the elastic fabrics described herein are useful in the manufacture of consumer products. Examples include seat covers, domestic linens, tablecloths, and car covers. It is also contemplated that the inventive elastic fabrics may make-up either a portion or a component of the articles described above, such as an inner or outer layer of a fabric. Other particular uses of the fabrics described herein include bed pads, bags, packaging material, packages, swimwear, body fluid impermeable backsheets, body fluid impermeable layers, body fluid permeable layers, body fluid permeable covers, absorbents, tissues, nonwoven composites, liners, cloth linings, scrubbing pads, face masks, respirators, air filters, liquid filter, vacuum bags, oil and chemical spill sorbents, thermal insulation, first aid dressings, medical wraps, fiberfill, outerwear, bed quilt stuffing, furniture padding, scrubbing pads, wipe materials, hosiery, automotive seats, upholstered furniture, carpets, carpet backing, filter media, disposable wipes, diaper coverstock, gardening fabric, geomembranes, geotextiles, sacks, housewrap, vapor barriers, breathable clothing, envelops, tamper evident fabrics, protective packaging, and coasters.

EXAMPLES

Procedure for the Preparation of the Reactor Grade RGP ("RGP")

All polymerizations were performed in a liquid filled, single-stage continuous reactor using a metallocene catalyst system. The reactor was a 0.5-liter stainless steel autoclave reactor and was equipped with a stirrer, water cooling/steam heating element with a temperature controller, and a pressure controller. Solvents, propylene, and comonomers (ethylene) were first purified by passing through a three-column purification system. The purification system consisted of an Oxiclear™ column (Model No. RGP-R1-260 from Labclear) followed by a 5A and a 3A molecular sieve columns. Purification columns were regenerated periodically whenever there was evidence of lower activity of polymerization. Both the 3A and 5A molecular sieve columns were regenerated in-house under nitrogen at a set temperature of 260° C. and 315° C., respectively. The molecular sieve material was purchased from Aldrich. The purified solvents and monomers were then chilled to about −15° C. by passing through a chiller before being fed into the reactor through a manifold. Solvent and monomers were mixed in the manifold and fed into reactor through a single tube. All liquid flow rates were measured using Brooksfield mass flow meters or Micro-Motion Coriolis-type flow meters.

The catalyst used to form the RGP used in the inventive examples was rac-dimethylsilylbisindenyl hafnium dimethyl (obtained from Albemarle) pre-activated with N,N-dimethylanilinium tetrakis(pentafluorophenyl) (obtained from Albemarle) at a molar ratio of about 1:1 in toluene. The catalyst solution was kept in an inert atmosphere with less than 1.5 ppm water content and was fed into reactor by a metering pump through a separated line. Catalyst and monomer contacts took place in the reactor.

As an impurity scavenger, 250 ml of tri-n-octyl aluminum (TNOA) (25 wt % in hexane, Sigma Aldrich) was diluted in 22.83 kilogram of hexane. The TNOA solution was stored in a 37.9-liter cylinder under nitrogen blanket. The solution was used for all polymerization runs until about 90% of consumption, then a new batch was prepared. Pumping rates of the TNOA solution varied from polymerization reaction to reaction, ranging from 0 (no scavenger) to 4 ml per minute.

The reactor was first cleaned by continuously pumping solvent (e.g., hexane) and scavenger through the reactor system for at least one hour at a maximum allowed temperature (about 150° C.). After cleaning, the reactor was heated/cooled to a temperature within the range of from 98 to 110° C., the exact temperature depending upon the desired molecular weight of polymer product, using a water/steam mixture flowing through the reactor jacket and controlled at a set pressure with controlled solvent flow. Monomers and catalyst solutions were then fed into the reactor when a steady state of operation was reached. An automatic temperature control system was used to control and maintain the reactor at a set temperature. Onset of polymerization activity was determined by observations of a viscous product and lower temperature of water-steam mixture. Once the activity was established and the system reached equilibrium, the reactor was lined out by continuing operating the system under the established condition for a time period of at least five times of mean residence time prior to sample collection. The resulting mixture, containing mostly solvent, polymer and unreacted monomers, was collected in a collection box after the system reached a steady state operation. The collected samples were first air-dried in a hood to evaporate most of the solvent, and then dried in a vacuum oven at a temperature of about 90° C. for about 12 hours. The vacuum oven dried samples were weighed to obtain yields. All the reactions were carried out at a pressure of about 2.41 MPa-g.

Materials:
Comparative Materials
Propylene-α-olefin copolymer (F.1.1): A Vistamaxx™ elastomer VM2320 with a MFR at 230° C. of 200 g/10 min (ExxonMobil Chemical Co.).
Propylene-α-olefin copolymer (F.1.2): A Vistamaxx elastomer VM2320 (ExxonMobil Chemical Co.) treated with 4260 ppm of a peroxide, Luperox™ 101 (Arkema Chemical), with a MFR at 230° C. of 1260 g/10 min.
Propylene-α-olefin copolymer (F.1.3): Escorene™ PP 3746G, a homoisotactic polypropylene with a MFR at 230° C. of 1246 g/10 min (ExxonMobil Chemical Co.).
Propylene-α-olefin copolymer (F.1.4): Achieve 6936G1, a homoisotactic polypropylene, made with a metallocene catalyst with a MFR at 230° C. of 1600 g/10 min (ExxonMobil Chemical Co.).
Inventive Materials
The inventive reactor grade RGP materials were prepared according to the previously mentioned polymerization procedure. Sample characteristics are summarized in Table 2.

TABLE 2

Inventive Sample Characteristics

| Sample | wt % C2 | Tm (C.) | Tc (C.) | ΔHf (J/g) | Viscosity @ 190° C. (cp) | MFR @ 230° C. (g/10 min) |
|---|---|---|---|---|---|---|
| F.2.1 | 11.5 | 62.4 | 11.06 | 25 | 11010 | 1713 |
| F.2.2 | 11.6 | 62.14 | 8.56 | 18.8 | 7091 | 2370 |
| F.2.3 | 13.2 | 47.25 | — | 10 | 17920 | — |
| F.2.4 | 15.6 | 48.45 | — | 5 | 18420 | — |

Second polypropylene (SPP.1): Escorene™ PP 3746G, a homoisotactic polypropylene with a MFR at 230° C. of 1400 g/10 min (ExxonMobil Chemical Co.).
Second polypropylene (SPP.2): Achieve™ 6936G1 a homoisotactic polypropylene, made with a metallocene catalyst with a MFR at 230° C. of 1600 g/10 min (ExxonMobil Chemical Co.).
Second polypropylene (SPP.3): a experimental Ziegler-Natta produced isotactic homopolypropylene with a MFR at 230° C. of 800 g/10 min (after treatment with peroxide), and a melting temperature ($T_m$) of about 160° C.

Example 1

Comparative Examples of Melt Blown Fabric

The fabrics were produced on a 260 mm wide melt blown line manufactured by Reifenhäuser GmbH & Co. The sample composition, fabric properties, and processing conditions were as noted in below in Table 3.

Polymer pellets were introduced into the extruder of the melt blown process. After the polymer had been melted and homogenized in the extruder due to the shear and external heat, the extruder delivered the homogenized molten polymer to a melt pump, which delivered the molten polymer to the melt blown die. The die consisted of a "coat hanger" to distribute the melt from the entrance to the die body to the whole width of the die. The molten polymer had filtered and flowed to the die tip, which is basically a single row of capillaries (melt blown die tip). The capillary of each hole was 0.4 mm in diameter. The molten polymer exiting the die was attenuated by the high velocity air which is heated to near the same temperature as the molten polymer at the die. The air was supplied by a compressor, heated and introduced to the die body. Those who are skilled in the art are familiar with the general set up of the melt blown process. The air gap where the hot air exit was set at 0.8 mm and the set-back of the die tip was also set at 0.8 mm. This allowed the air to exit at high velocity and attenuation of the fiber. The fiber exiting the die tip was attenuated first by the hot air and then quenched by the ambient air. The melt blown fiber was then collected on the moving porous belt (forming belt) to form the nonwoven melt blown web. The web had sufficient strength that no thermal bonding was required. The web was then tested for the physical properties.

Example 2

Comparative Examples of Melt Blown Fabric

The fabrics were produced on a 260 mm wide melt blown line manufactured by Reifenhäuser GmbH & Co according to the procedure described in Example 1. Pellets of the comparative reactor grade RGP were blended with a peroxide in a white oil mixture, then introduced into the extruder for melt homogenization and molecular weight degradation via peroxide initiated chain scission. The sample composition, fabric properties, and processing conditions were as noted in below in Table 4.

Example 3 and Example 4

Comparative Examples of Melt Blown Fabric

Granules of the following polymers as in the Tables 5-7 were converted into melt blown fabric using the procedure outlined in Example 1. The composition data, fabric properties and processing conditions are noted below in Table 5-7.

Example 5-Example 7

Inventive Examples of Melt Blown Fabric

A dry blend of reactor grade RGP and second polypropylene and any additional additives may be dry blended and fed directly into the extruder of the melt blown process. The dry blended pellets, granules and additives were introduced into the extruder of the melt blown process. A slip concentrate included in some compositions is a 70/30 Vistamaxx™ 2125/erucamide masterbatch. The erucamide is Polyvel™ S 1428, and Vistamaxx 2125 propylene-α-olefin is available from ExxonMobil Chemical Company. Dry blended compositions as outlined in Table 8-Table 16 were made into melt blown fabric by the procedure outlined earlier. The fabric properties and processing conditions are noted below in Table 8-Table 16.

Test Methods
Differential Scanning Calorimetry

Differential Scanning Calorimetry (DSC) is described as follows: 6 to 10 mg of a sheet of the polymer pressed at approximately 200° C. to 230° C. is removed with a punch die or part of a polymer pellet. The sample is placed in a Differential Scanning Calorimeter (Perkin Elmer 7 Series Thermal Analysis System) and cooled to −50° C. to −70° C. The sample is heated at 10° C./min to attain a final temperature of 200° C. to 220° C. The thermal output during this heating is recorded. The melting peak of the sample is typically peaked at 30° C. to 175° C. and occurs between the temperatures of 0° C. and 200° C. The area under the thermal output curve, measured in Joules, is a measure of the heat of fusion ($\Delta H_f$ or $H_f$). The melting point ($T_m$) is recorded as the temperature of the greatest heat absorption within the range of melting of the sample.

Tensile and Elongation of the Fabric

As used herein, the tensile strength and elongation of a fabric may be measured according to the ASTM test D-5035 with four modifications: 1) the jaw width is 5 in instead of 3 in, 2) test speed is 5 in/min instead of 12 in/min, 3) metallic arc-type upper line grip and a flat lower rubber grip instead of a flat metallic upper and a flat metallic of other lower grip, and 6 MD and 6 CD measurements instead of 5 MD and 8 CD measurements are made for each specimen. This test measures the strength in pounds and elongation in percent of a fabric.

Extensibility is a desirable attribute for many applications. As stated above, the tensile strength and elongation of a fabric may be measured according to the ASTM D-5035 with four modifications: 1) the jaw width is 5 in instead of 3 in, 2) test speed is 5 in/min instead of 12 in/min, 3) metallic arc-type upper line grip and a flat lower rubber grip instead of a flat metallic upper and a flat metallic of other lower grip, and 6 MD and 6 CD measurements instead of 5 MD and 8 CD measurements are made for each specimen. It can be measured as "peak elongation" or "break elongation." Peak elongation is percent increase in length of the specimen when the stress of the specimen is at its maximum. Break elongation is percent increase in length of the specimen when the specimen breaks. The elongation can be measured in the machine direction (MD) of the fabric or the cross direction (CD) of the fabric. The MD elongation is normally lower than the CD due to machine direction orientation of the fibers. The Elongation values used throughout have an error of ±10% of the reported percentage value. Thus, for example, a reported value of 70% elongation has an expected value between 63% and 77%.

Melt Flow Rate

The melt flow rate (MFR) is a measure of the viscosity of polymers. The MFR is expressed as the weight of material which flows from a capillary of known dimensions under a 2.16 kg load at 230° C. for a measured period of time and is measured in grams/10 minutes according to ASTM test 1238.

Softness of the Fabric ("Handle")

The softness of a nonwoven fabric may be measured according to the "Handle-O-Meter" test as specified in operating manual on Handle-O-Meter model number 211-5 from the Thwing-Albert Instrument Co. The Handle-O-Meter reading is in units of grams. The modifications are: (1) Two specimens per sample were used and (2) Readings are kept below 100 gram by adjusting the slot width used and the same slot width is used through out the whole series of samples being compared. The Handle values used throughout have an error of ±25% of the reported percentage value.

Hydrostatic Pressure Test Procedure

"Hydrohead" is a measure of the liquid barrier properties of a fabric. The hydrohead test determines the height of water (in centimeters) which the fabric will support before a predetermined amount of liquid passes through. A fabric with a higher hydrohead reading indicates it has a greater barrier to liquid penetration than a fabric with a lower hydrohead. The hydrohead test can be performed according to Federal Test Standard 191A, Method 5514, or with slight variations of this test as set forth below.

In this test, water pressure is measured to determine how much water pressure is required to induce leakage in three separate areas of a test material. The water pressure is reported in millibars (mbars) at the first sign of leakage in three separate areas of the test specimen. The pressure in millibars can be converted to hydrostatic head height in inches of water by multiplying millibars by 0.402. Pressure measured in terms of inches refers to pressure exerted by a number of inches of water. Hydrostatic pressure is pressure exerted by water at rest.

Apparatus used to carry out the procedure includes a hydrostatic head tester, such as TEXTEST FX-3000 available from ATI Advanced Testing Instruments Corp. of Spartenburg, S.C., a 25.7 $cm^2$ test head such as part number FX3000-26 also available from ATI Advanced Testing Instruments Corp., purified water such as distilled, deionized, or purified by reverse osmosis, a stopwatch accurate to 0.1 second, a one-inch circular level, and a cutting device, such as scissors, a paper cutter, or a die-cutter.

Prior to carrying out this procedure, any calibration routines recommended by manufacturers of the apparatus being used should be performed. Using the cutting device, the specimen is cut to the appropriate size. Each specimen has a minimum size that is sufficient to allow material to extend beyond the outer diameter of the test head. For example, the 25.7 $cm^2$ test head requires a 6-inch by 6-inch, or 6-inch diameter specimen. Specimens should be free of unusual holes, tears, folds, wrinkles, or other distortions.

Prior to the test the hydrostatic head tester is level, and that the drain faucet at the front of the instrument is closed. Pull the upper test head clamp to the left side of the instrument. Pour approximately 0.5 liter of purified water into the test head until the head is filled to the rim. Push the upper test head clamp back onto the dovetail and make sure the plug is inserted into the socket at the left side of the instrument. Turn the instrument on and allow the sensor to stabilize for 15 minutes. Set the pressure gradient thumbwheel switch to 60 mbar/min. Make sure the drain faucet is closed. The water temperature should be maintained at about 24° C. (±5° C.). Set the test head illumination for best visibility of water droplets passing through the specimen.

Once the set-up is complete, slide the specimen onto the surface of the water in the test head, from the front side of the tester. Make sure there are no air bubbles under the specimen and that the specimen extends beyond the outer diameter of the test head on all sides. If the upper test head clamp was removed for loading the specimen, push the clamp back onto the dovetail. Pull down the lever to clamp the specimen to the test head and push the lever until it comes to a stop. Press the "Reset" button to reset the pressure sensor to "zero." Press the Start/Pause button to start the test. Observe the specimen surface and watch for water passing through the specimen. When water droplets form in three separate areas of the specimen, the test is complete. Any drops that form within approximately 0.13 inch (3.25 mm) of the edge of the clamp should be ignored. If numerous drops or a leak forms at the edge of the clamp, repeat the test with another specimen. Once the test is complete, read the water pressure from the display and record. Press the Reset button to release the pressure from the specimen for removal. Repeat procedure for desired number of specimen repeats.

Air Permeability

This test determines the airflow rate through a sample for a set area size and pressure. The higher the airflow rate per a given area and pressure, the more open the fabric is, thus allowing more fluid to pass through the fabric. Air permeability is determined using a pressure of 125 Pa (0.5 inch water column) and is reported in cubic feet per minute per square foot. The air permeability data reported can be obtained using a TEXTEST FX 3300 air permeability tester.

Fiber Diameter Test Procedures

Fiber diameters were tested using a Scanning Electron Microscope (SEM) Image Analysis of Meltblown Fiber Diameter test. The meltblown web was tested for Count-Based Mean Diameter and Volume-Based Mean Diameter.

Ethylene Content of RGP

The composition of the RGP was measured as ethylene weight percent according to the following technique. A thin homogeneous film of the second polypropylene, pressed at a temperature of or greater than 150° C. was mounted on a Perkin Elmer PE 1760 infra red spectrophotometer. A full spectrum of the sample from 600 $cm^{-1}$ to 400 $cm^{-1}$ was recorded and the ethylene weight percent of the second polypropylene was calculated according to Equation 1 as follows: ethylene wt %=$82.585-111.987X+30.045X^2$; wherein X is the ratio of the peak height at 1155 $cm^{-1}$ and peak height at either 722 $cm^{-1}$ or 732 $cm^{-1}$, which ever is higher.

Molecular Weight of the RGP: By GPC

Molecular weights (weight average molecular weight (Mw) and number average molecular weight (Mn)) are determined using a Waters 150 Size Exclusion Chromatograph (SEC) equipped with a differential refractive index detector (DRI), an online low angle light scattering (LALLS) detector and a viscometer (VIS). The details of the detector calibrations have been described elsewhere (Reference: T. Sun, P. Brant, R. R. Chance, and W. W. Graessley, 34(19) MACROMOLECULES, 6812-6820 (2001)); attached below are brief descriptions of the components.

The SEC with three Polymer Laboratories PLgel 10 mm Mixed-B columns, a nominal flow rate 0.5 $cm^3$/min, and a nominal injection volume 300 μL is common to both detector configurations. The various transfer lines, columns and differential refractometer (the DRI detector, used mainly to determine eluting solution concentrations) are contained in an oven maintained at 135° C. The LALLS detector is the model 2040 dual-angle light scattering photometer (Precision Detector Inc.). Its flow cell, located in the SEC oven, uses a 690 nm diode laser light source and collects scattered light at two angles, 15° and 90°. Only the 15° output was used in these experiments. Its signal is sent to a data acquisition board (National Instruments) that accumulates readings at a rate of 16 per second. The lowest four readings are averaged, and then a proportional signal is sent to the SEC-LALLS-VIS computer. The LALLS detector is placed after the SEC columns, but before the viscometer.

The viscometer is a high temperature Model 150R (Viscotek Corporation). It consists of four capillaries arranged in a Wheatstone bridge configuration with two pressure transducers. One transducer measures the total pressure drop across the detector, and the other, positioned between the two sides of the bridge, measures a differential pressure. The specific viscosity for the solution flowing through the viscometer is calculated from their outputs. The viscometer is inside the SEC oven, positioned after the LALLS detector but before the DRI detector.

Solvent for the SEC experiment was prepared by adding 6 grams of butylated hydroxy toluene (BHT) as an antioxidant to a 4 liter bottle of 1,2,4-trichlorobenzene (TCB, Aldrich Reagent grade) and waiting for the BHT to solubilize. The TCB mixture was then filtered through a 0.7 μm glass pre-filter and subsequently through a 0.1 μm Teflon filter. There was an additional online 0.7 μm glass pre-filter/0.22 μm Teflon filter assembly between the high pressure pump and SEC columns. The TCB was then degassed with an online degasser (Phenomenex™ Model DG-4000) before entering the SEC.

Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units are 1.463 g/ml at room temperature and 1.324 g/ml at 135° C. The injection concentration ranged from 1.0 to 2.0 mg/ml, with lower concentrations being used for higher molecular weight samples.

Prior to running each sample the DRI detector and the injector were purged. Flow rate in the apparatus was then increased to 0.5 ml/minute, and the DRI was allowed to stabilize for 8-9 hours before injecting the first sample. The argon ion laser was turned on 1 to 1.5 hours before running samples by running the laser in idle mode for 20-30 minutes and then switching to full power in light regulation mode. The error in the Mw/Mn values discussed herein is typically ±15%.

TABLE 3

| | Example 1 | | | | | | |
|---|---|---|---|---|---|---|---|
| | Example 1- | | | | | | |
| | 1 | 2 | 3 | 4 | 5 | 6 | 7 |
| Compositions | | | | | | | |
| F.1.1 (wt %) | 100 | 100 | 100 | 100 | 100 | 100 | 100 |
| S.1 (wt %) | — | — | — | — | — | — | — |
| S.2 (wt %) | — | — | — | — | — | — | — |
| S.3 (wt %) | — | — | — | — | — | — | — |
| Properties | | | | | | | |
| MD Tensile Strength (lb) | 0.4 | 0.6 | 0.7 | 1.3 | 1.5 | 0.9 | 0.3 |
| MD Elongation (%) | 89.8 | 96.2 | 141.3 | 230.3 | 161.8 | 158.0 | 120.0 |
| CD Tensile Strength (lb) | 0.3 | 0.5 | 0.5 | 0.9 | 1.0 | 0.7 | 0.2 |
| CD Elongation (%) | 137.3 | 140.3 | 226.7 | 248.0 | 177.4 | 241.0 | 164.0 |
| Handle (g) | — | — | — | — | — | 44.7 | 40.4 |
| Hydrostatic head (mbar) | 44.8 | 22.9 | 35.3 | 42.3 | 28.0 | 32.9 | 8.8 |
| Air Permeability (ft$^3$/ft$^2$/min) | 69.1 | 82.0 | 57.8 | 31.9 | 36.6 | 56.8 | 187.9 |
| Conditions | | | | | | | |
| Melt Temperature (C.) | 246 | 246 | 246 | 246 | 246 | 245 | 245 |
| Throughput (g/hole/min) | 0.2 | 0.4 | 0.4 | 0.4 | 0.6 | 0.2 | 0.2 |
| DCD (mm) | 300 | 300 | 300 | 300 | 350 | 300 | 300 |
| Basis weight (g/m$^2$) | 35 | 55 | 70 | 100 | 135 | 35 | 70 |

TABLE 4

| | Example 2 | | | | |
|---|---|---|---|---|---|
| | Example 2- | | | | |
| | 1 | 2 | 3 | 4 | 5 |
| Compositions | | | | | |
| F.1.2 (wt %) | 90 | 90 | 90 | 90 | 90 |
| S.1 (wt %) | 10 | 10 | 10 | 10 | 10 |
| S.2 (wt %) | — | — | — | — | — |
| S.3 (wt %) | — | — | — | — | — |
| Properties | | | | | |
| MD Tensile Strength (lb) | 0.6 | 0.6 | 0.9 | 0.5 | 0.8 |
| MD Elongation (%) | 44.7 | 66.6 | 65.3 | 44.1 | 46.1 |
| CD Tensile Strength (lb) | 0.4 | 0.5 | 0.8 | 0.4 | 0.7 |
| CD Elongation (%) | 69.9 | 86.4 | 85.9 | 66.2 | 76.4 |
| Handle (g) | — | — | — | — | — |
| Hydrostatic head (mbar) | 17.6 | 28.5 | 30.5 | 18.8 | 28.6 |
| Air Permeability (ft$^3$/ft$^2$/min) | 45.4 | 65.7 | 43.3 | 127.2 | 45.8 |
| Conditions | | | | | |
| Melt Temperature (C.) | 246 | 246 | 246 | 246 | 246 |
| Throughput (g/hole/min) | 299 | 299 | 299 | 299 | 299 |
| DCD (mm) | 0.2 | 0.4 | 0.4 | 0.6 | 0.6 |
| Basis weight (g/m$^2$) | 70 | 70 | 105 | 70 | 105 |

TABLE 5

| | Example 3 | | | | | | | | | |
|---|---|---|---|---|---|---|---|---|---|---|
| | Example 3- | | | | | | | | | |
| | 1 | 2 | 3 | 4 | 5 | 6 | 7 | 8 | 9 | 10 |
| Compositions | | | | | | | | | | |
| F.1.3 (wt %) | 100 | 100 | 100 | 100 | 100 | 100 | 100 | 100 | 100 | 100 |
| S.1 (wt %) | — | — | — | — | — | — | — | — | — | — |
| S.2 (wt %) | — | — | — | — | — | — | — | — | — | — |
| S.3 (wt %) | — | — | — | — | — | — | — | — | — | — |
| Properties | | | | | | | | | | |
| MD Tensile Strength (lb) | 1.2 | 1.6 | 2.6 | 1.4 | 1.1 | 1.5 | 1.3 | 1.4 | 2.2 | 1.6 |
| MD Elongation (%) | 1.3 | 1.0 | 0.8 | 1.3 | 0.8 | 0.5 | 1.8 | 1.1 | 0.8 | 14.5 |
| CD Tensile Strength (lb) | 0.5 | 0.6 | 0.8 | 0.5 | 0.4 | 0.5 | 0.4 | 0.7 | 1.0 | 0.9 |
| CD Elongation (%) | 2.3 | 1.5 | 1.0 | 1.9 | 1.3 | 0.7 | 2.5 | 2.0 | 1.0 | 20.5 |
| Handle (g) | 38.2 | 50.1 | 36.9 | 50.1 | 19.5 | 43.0 | 35.3 | 65.6 | 50.4 | 98.1 |
| Hydrostatic head (mbar) | 34.4 | 35.4 | 33.3 | 25.4 | 20.1 | 17.4 | 47.6 | 37.0 | 28.1 | 61.3 |
| Air Permeability (ft$^3$/ft$^2$/min) | 44.5 | 31.4 | 14.7 | 44.7 | 35.7 | 15.0 | 57.0 | 34.5 | 21.1 | 58.6 |
| Conditions | | | | | | | | | | |
| Melt Temperature (C.) | 266 | 266 | 266 | 266 | 266 | 266 | 266 | 266 | 266 | 249 |
| Throughput (g/hole/min) | 0.4 | 0.4 | 0.4 | 0.6 | 0.6 | 0.6 | 0.8 | 0.8 | 0.8 | 0.4 |
| DCD (mm) | 200 | 200 | 200 | 200 | 200 | 200 | 250 | 250 | 250 | 200 |
| Basis weight (g/m$^2$) | 25 | 35 | 70 | 25 | 35 | 70 | 25 | 35 | 70 | 25 |

TABLE 6

Example 3 (continued)

| | Example 3- | | | | | | | | |
|---|---|---|---|---|---|---|---|---|---|
| | 11 | 12 | 13 | 14 | 15 | 16 | 17 | 18 | 19 |
| Compositions | | | | | | | | | |
| F.1.3 (wt %) | 100 | 100 | 100 | 100 | 100 | 100 | 100 | 100 | 100 |
| S.1 (wt %) | — | — | — | — | — | — | — | — | — |
| S.2 (wt %) | — | — | — | — | — | — | — | — | — |
| S.3 (wt %) | — | — | — | — | — | — | — | — | — |
| Properties | | | | | | | | | |
| MD Tensile Strength (lb) | 2.1 | 4.0 | 1.6 | 2.3 | 4.5 | 1.4 | 1.9 | 3.7 | 2.1 |
| MD Elongation (%) | 9.5 | 3.9 | 5.8 | 3.5 | 2.6 | 7.6 | 6.1 | 3.3 | 19.0 |
| CD Tensile Strength (lb) | 1.4 | 2.4 | 0.9 | 1.1 | 2.2 | 0.8 | 1.2 | 2.3 | 1.6 |
| CD Elongation (%) | 20.4 | 11.4 | 10.0 | 5.5 | 3.7 | 17.0 | 12.5 | 5.5 | 25.0 |
| Handle (g) | 78.7 | 150.0 | 109.9 | 85.6 | 144.0 | 95.6 | 74.9 | 149.0 | 65.5 |
| Hydrostatic head (mbar) | 74.8 | 88.0 | 62.3 | 68.5 | 89.6 | 57.0 | 63.0 | 76.4 | 72.1 |
| Air Permeability (ft$^3$/ft$^2$/min) | 40.1 | 20.3 | 60.5 | 41.2 | 20.8 | 79.4 | 51.0 | 24.5 | 37.7 |
| Conditions | | | | | | | | | |
| Melt Temperature (C.) | 249 | 249 | 249 | 249 | 249 | 249 | 249 | 249 | 446 |
| Throughput (g/hole/min) | 0.4 | 0.4 | 0.6 | 0.6 | 0.6 | 0.8 | 0.8 | 0.8 | 0.2 |
| DCD (mm) | 200 | 200 | 200 | 200 | 200 | 250 | 250 | 250 | 200 |
| Basis weight (g/m$^2$) | 35 | 70 | 25 | 35 | 70 | 25 | 35 | 70 | 35 |

TABLE 7

Example 4

| Example 4- | 1 | 2 | 3 | 4 |
|---|---|---|---|---|
| Compositions | | | | |
| F.1.4 (wt %) | 100 | 100 | 100 | 100 |
| S.1 (wt %) | — | — | — | — |
| S.2 (wt %) | — | — | — | — |
| S.3 (wt %) | — | — | — | — |
| Properties | | | | |
| MD Tensile Strength (lb) | 2.0 | 2.4 | 2.7 | 1.7 |
| MD Elongation (%) | 17.8 | 23.1 | 16.9 | 23.9 |
| CD Tensile Strength (lb) | 1.7 | 1.9 | 1.5 | 1.6 |
| CD Elongation (%) | 41.1 | 35.7 | 20.6 | 32.3 |
| Handle (g) | — | — | — | — |
| Hydrostatic head (mbar) | 85.0 | 83.8 | 81.3 | 62.9 |
| Air Permeability (ft$^3$/ft$^2$/min) | 32.1 | 33.9 | 36.5 | 51.2 |
| Conditions | | | | |
| Melt Temperature (C.) | 246 | 246 | 246 | 246 |
| Throughput (g/hole/min) | 0.2 | 0.4 | 0.6 | 0.6 |
| DCD (mm) | 200 | 200 | 200 | 300 |
| Basis weight (g/m$^2$) | 35 | 35 | 35 | 35 |

TABLE 8

Example 5

| | Example 5- | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| Compositions | | | | | | | | | | | | | | | | | | |
| F.2.2 (wt %) | 5 | 5 | 5 | 5 | 5 | 5 | 5 | 5 | 5 | 10 | 10 | 10 | 10 | 10 | 10 | 10 | 10 | 10 |
| S.1 (wt %) | 95 | 95 | 95 | 95 | 95 | 95 | 95 | 95 | 95 | 90 | 90 | 90 | 90 | 90 | 90 | 90 | 90 | 90 |
| S.2 (wt %) | — | — | — | — | — | — | — | — | — | — | — | — | — | — | — | — | — | — |
| S.3 (wt %) | — | — | — | — | — | — | — | — | — | — | — | — | — | — | — | — | — | — |
| Properties | | | | | | | | | | | | | | | | | | |
| MD Tensile Strength (lb) | 1.2 | 1.7 | 2.3 | 1.4 | 1.2 | 2.5 | 1.3 | 1.8 | 4.0 | 1.5 | 2.3 | 3.0 | 1.4 | 1.8 | 3.0 | 1.5 | 1.9 | 4.1 |
| MD Elongation (%) | 1.9 | 1.4 | 0.8 | 2.0 | 0.9 | 0.7 | 3.1 | 2.0 | 1.5 | 3.9 | 4.6 | 1.6 | 5.9 | 2.4 | 1.2 | 5.8 | 3.8 | 2.1 |
| CD Tensile Strength (lb) | 0.3 | 0.6 | 0.8 | 0.4 | 0.6 | 0.8 | 0.5 | 0.9 | 1.8 | 0.6 | 0.9 | 1.9 | 0.7 | 0.7 | 1.4 | 0.6 | 0.9 | 1.7 |
| CD Elongation (%) | 2.2 | 1.9 | 1.1 | 2.1 | 1.9 | 0.9 | 3.1 | 3.1 | 1.9 | 4.2 | 3.7 | 2.6 | 4.7 | 2.7 | 1.7 | 5.8 | 3.8 | 2.7 |
| Handle (g) | 33.6 | 65.7 | 43.9 | 35.6 | 68.4 | 43.2 | 33.8 | 66.7 | 43.7 | 35.3 | 67.7 | 40.2 | 36.5 | 67.0 | 51.6 | 32.8 | — | 53.1 |
| Hydrostatic head (mbar) | 35.8 | 31.8 | 30.0 | 24.8 | 28.1 | 15.8 | 41.9 | 42.9 | 44.4 | 58.0 | 77.3 | 83.5 | 49.1 | 42.9 | 30.9 | 49.0 | 57.0 | 75.8 |
| Air Permeability (ft$^3$/ft$^2$/min) | 39.4 | 30.3 | 15.5 | 49.5 | 34.8 | 17.5 | 64.7 | 49.3 | 21.3 | 53.8 | 36.0 | 21.1 | 61.3 | 41.5 | 20.0 | 67.3 | 48.6 | 20.2 |

TABLE 8-continued

Example 5

| | Example 5- | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| Conditions | | | | | | | | | | | | | | | | | | |
| Melt Temperature (C.) | 266 | 266 | 266 | 266 | 266 | 266 | 266 | 266 | 266 | 266 | 266 | 266 | 266 | 266 | 266 | 266 | 266 | 266 |
| Throughput (g/hole/min) | 0.4 | 0.4 | 0.4 | 0.6 | 0.6 | 0.6 | 0.8 | 0.8 | 0.8 | 0.4 | 0.4 | 0.4 | 0.6 | 0.6 | 0.6 | 0.8 | 0.8 | 0.8 |
| DCD (mm) | 200 | 200 | 200 | 200 | 200 | 200 | 250 | 250 | 250 | 200 | 200 | 200 | 200 | 200 | 200 | 250 | 250 | 250 |
| Basis weight (g/m$^2$) | 25 | 35 | 70 | 25 | 35 | 70 | 25 | 35 | 70 | 25 | 35 | 70 | 25 | 35 | 70 | 25 | 35 | 70 |

TABLE 9

Example 5 (continued)

| | Example 5- | | | | | | | | | | | | | | | | | |
|---|---|---|---|---|---|---|---|---|---|---|---|---|---|---|---|---|---|---|
| | 19 | 20 | 21 | 22 | 23 | 24 | 25 | 26 | 27 | 28 | 29 | 30 | 31 | 32 | 33 | 34 | 35 | 36 |
| Compositions | | | | | | | | | | | | | | | | | | |
| F.2.2 (wt %) | 20 | 20 | 20 | 20 | 20 | 20 | 20 | 20 | 20 | 30 | 30 | 30 | 30 | 30 | 30 | 30 | 30 | 30 |
| S.1 (wt %) | 80 | 80 | 80 | 80 | 80 | 80 | 80 | 80 | 80 | 70 | 70 | 70 | 70 | 70 | 70 | 70 | 70 | 70 |
| S.2 (wt %) | — | — | — | — | — | — | — | — | — | — | — | — | — | — | — | — | — | — |
| S.3 (wt %) | — | — | — | — | — | — | — | — | — | — | — | — | — | — | — | — | — | — |
| Properties | | | | | | | | | | | | | | | | | | |
| MD Tensile Strength (lb) | 1.6 | 2.4 | 3.3 | 1.6 | 1.9 | 3.4 | 1.6 | 2.3 | 4.2 | 1.5 | 2.2 | 3.6 | 1.4 | 2.1 | 3.1 | 1.5 | 2.1 | 4.1 |
| MD Elongation (%) | 17.7 | 13.6 | 2.8 | 6.8 | 4.1 | 2.3 | 10.6 | 9.4 | 4.9 | 18.3 | 12.4 | 4.3 | 9.1 | 7.7 | 3.3 | 15.3 | 13.2 | 6.9 |
| CD Tensile Strength (lb) | 0.7 | 0.9 | 1.2 | 0.6 | 0.8 | 1.3 | 0.8 | 1.0 | 1.8 | 0.7 | 0.9 | 1.6 | 0.5 | 0.9 | 1.1 | 0.8 | 0.9 | 1.5 |
| CD Elongation (%) | 14.6 | 5.1 | 1.9 | 9.0 | 4.0 | 2.5 | 19.2 | 15.2 | 5.6 | 23.4 | 13.7 | 4.8 | 10.7 | 10.2 | 3.7 | 34.1 | 17.2 | 7.0 |
| Handle (g) | 28.1 | 49.2 | 41.3 | 30.6 | — | 44.9 | 25.2 | — | 36.5 | 21.2 | 41.5 | 72.1 | 25.2 | — | 31.9 | 23.1 | — | 24.3 |
| Hydrostatic head (mbar) | 63.9 | 87.4 | 62.6 | 60.1 | 62.0 | 41.8 | 46.3 | 69.6 | 83.1 | 69.4 | 87.6 | 74.0 | 55.8 | 68.5 | 47.0 | 50.1 | 67.9 | 68.3 |
| Air Permeability (ft$^3$/ft$^2$/min) | 44.5 | 32.6 | 20.0 | 46.5 | 34.6 | 18.5 | 57.4 | 38.2 | 18.4 | 46.3 | 33.9 | 20.7 | 57.0 | 41.0 | 17.3 | 56.3 | 38.7 | 21.1 |
| Conditions | | | | | | | | | | | | | | | | | | |
| Melt Temperature (C.) | 266 | 266 | 266 | 266 | 266 | 266 | 266 | 266 | 266 | 266 | 266 | 266 | 266 | 266 | 266 | 266 | 266 | 266 |
| Throughput (g/hole/min) | 0.4 | 0.4 | 0.4 | 0.6 | 0.6 | 0.6 | 0.8 | 0.8 | 0.8 | 0.4 | 0.4 | 0.4 | 0.6 | 0.6 | 0.6 | 0.8 | 0.8 | 0.8 |
| DCD (mm) | 200 | 200 | 200 | 200 | 200 | 200 | 250 | 250 | 250 | 200 | 200 | 200 | 200 | 200 | 200 | 250 | 250 | 250 |
| Basis weight (g/m$^2$) | 25 | 35 | 70 | 25 | 35 | 70 | 25 | 35 | 70 | 25 | 35 | 70 | 25 | 35 | 70 | 25 | 35 | 70 |

TABLE 10

Example 5 (continued)

| | Example 5- | | | | | | | | | | | | | | | | | |
|---|---|---|---|---|---|---|---|---|---|---|---|---|---|---|---|---|---|---|
| | 37 | 38 | 39 | 40 | 41 | 42 | 43 | 44 | 45 | 46 | 47 | 48 | 49 | 50 | 51 | 52 | 53 | 54 |
| Compositions | | | | | | | | | | | | | | | | | | |
| F.2.2 (wt %) | 40 | 40 | 40 | 40 | 40 | 40 | 40 | 40 | 40 | 20 | 20 | 20 | 20 | 20 | 20 | 20 | 20 | 20 |
| S.1 (wt %) | 60 | 60 | 60 | 60 | 60 | 60 | 60 | 60 | 60 | 80 | 80 | 80 | 80 | 80 | 80 | 80 | 80 | 80 |
| S.2 (wt %) | — | — | — | — | — | — | — | — | — | — | — | — | — | — | — | — | — | — |
| S.3 (wt %) | — | — | — | — | — | — | — | — | — | — | — | — | — | — | — | — | — | — |
| Properties | | | | | | | | | | | | | | | | | | |
| MD Tensile Strength (lb) | 1.1 | 1.5 | 2.9 | 1.1 | 1.6 | 3.1 | 1.2 | 1.7 | 3.9 | 1.7 | 2.3 | 4.2 | 1.6 | 2.4 | 4.5 | 1.7 | 2.1 | 4.0 |
| MD Elongation (%) | 25.5 | 18.1 | 12.3 | 17.7 | 15.6 | 7.3 | 18.1 | 20.2 | 10.8 | 22.1 | 11.4 | 6.3 | 8.1 | 9.1 | 4.1 | 17.7 | 11.4 | 7.7 |
| CD Tensile Strength (lb) | 0.4 | 0.7 | 1.5 | 0.4 | 0.7 | 1.5 | 0.6 | 0.9 | 1.8 | 1.0 | 1.4 | 2.1 | 0.9 | 1.3 | 2.7 | 0.9 | 1.3 | 2.5 |
| CD Elongation (%) | 32.1 | 18.7 | 12.9 | 24.8 | 19.7 | 11.2 | 28.3 | 36.0 | 12.2 | 36.7 | 25.2 | 12.2 | 17.8 | 14.0 | 7.9 | 27.9 | 26.6 | 14.9 |
| Handle (g) | 17.0 | 30.6 | 52.1 | 17.0 | — | 26.1 | 16.9 | — | 61.6 | 74.2 | 61.3 | 139.0 | 88.1 | 69.0 | 149.0 | 77.4 | 62.4 | 132.0 |

TABLE 10-continued

Example 5 (continued)

Example 5-

| | 37 | 38 | 39 | 40 | 41 | 42 | 43 | 44 | 45 | 46 | 47 | 48 | 49 | 50 | 51 | 52 | 53 | 54 |
|---|---|---|---|---|---|---|---|---|---|---|---|---|---|---|---|---|---|---|
| Hydrostatic head (mbar) | 41.8 | 62.3 | 77.6 | 51.6 | 31.8 | 35.6 | 41.8 | 44.4 | 56.6 | 72.5 | 82.5 | 95.3 | 68.5 | 74.5 | 91.4 | 43.4 | 65.3 | 79.8 |
| Air Permeability (ft$^3$/ft$^2$/min) | 54.5 | 44.4 | 19.5 | 55.5 | 47.8 | 20.8 | 69.4 | 43.3 | 19.8 | 51.5 | 35.9 | 20.2 | 58.0 | 39.4 | 18.9 | 72.9 | 48.1 | 23.6 |
| Conditions | | | | | | | | | | | | | | | | | | |
| Melt Temperature (C.) | 266 | 266 | 266 | 266 | 266 | 266 | 266 | 266 | 266 | 249 | 249 | 249 | 249 | 249 | 249 | 249 | 249 | 249 |
| Throughput (g/hole/min) | 0.4 | 0.4 | 0.4 | 0.6 | 0.6 | 0.6 | 0.8 | 0.8 | 0.8 | 0.4 | 0.4 | 0.4 | 0.6 | 0.6 | 0.6 | 0.8 | 0.8 | 0.8 |
| DCD (mm) | 200 | 200 | 200 | 200 | 200 | 200 | 250 | 250 | 250 | 200 | 200 | 200 | 200 | 200 | 200 | 250 | 250 | 250 |
| Basis weight (g/m$^2$) | 25 | 35 | 70 | 25 | 35 | 70 | 25 | 35 | 70 | 25 | 35 | 70 | 25 | 35 | 70 | 25 | 35 | 70 |

TABLE 11

Example 5 (continued)

| Example 5- | 55 | 56 | 57 | 58 | 59 | 60 | 61 | 62 | 63 | 64 | 65 | 66 | 67 | 68 | 69 | 70 | 71 | 72 |
|---|---|---|---|---|---|---|---|---|---|---|---|---|---|---|---|---|---|---|
| Compositions | | | | | | | | | | | | | | | | | | |
| F.2.2 (wt %) | 40 | 40 | 40 | 40 | 40 | 40 | 40 | 40 | 40 | 19.5 | 19.5 | 19.5 | 19.5 | 19.5 | 19.5 | 19.5 | 19.5 | 19.5 |
| S.1 (wt %) | 60 | 60 | 60 | 60 | 60 | 60 | 60 | 60 | 60 | 79.5 | 79.5 | 79.5 | 79.5 | 79.5 | 79.5 | 79.5 | 79.5 | 79.5 |
| S.2 (wt %) | — | — | — | — | — | — | — | — | — | — | — | — | — | — | — | — | — | — |
| S.3 (wt %) | — | — | — | — | — | — | — | — | — | — | — | — | — | — | — | — | — | — |
| Slip concentrate (erucamide) | — | — | — | — | — | — | — | — | — | 1 | 1 | 1 | 1 | 1 | 1 | 1 | 1 | 1 |
| Properties | | | | | | | | | | | | | | | | | | |
| MD Tensile Strength (lb) | 1.3 | 2.0 | 4.0 | 1.3 | 1.8 | 3.5 | 1.1 | 1.5 | 3.2 | 1.6 | 2.5 | 4.9 | 1.9 | 2.4 | 4.8 | 1.5 | 2.1 | 4.4 |
| MD Elongation (%) | 30.9 | 27.0 | 26.8 | 21.8 | 22.1 | 20.8 | 25.4 | 30.8 | 27.1 | 24.5 | 20.7 | 12.3 | 11.2 | 10.8 | 4.8 | 20.8 | 19.0 | 10.3 |
| CD Tensile Strength (lb) | 0.7 | 1.2 | 2.0 | 0.7 | 0.9 | 1.8 | 0.7 | 0.8 | 1.6 | 0.9 | 1.4 | 2.5 | 1.1 | 1.2 | 2.4 | 0.9 | 1.2 | 2.6 |
| CD Elongation (%) | 48.4 | 55.3 | 40.0 | 50.4 | 47.4 | 27.2 | 47.7 | 39.7 | 35.8 | 31.3 | 31.7 | 18.9 | 25.3 | 17.0 | 6.3 | 33.0 | 29.4 | 17.7 |
| Handle (g) | 46.5 | 39.7 | 53.1 | 37.2 | 30.7 | 47.1 | 35.1 | 26.0 | 37.8 | 73.2 | 64.1 | 127.0 | 81.5 | 66.6 | 147.0 | 65.2 | 51.6 | 128.0 |
| Hydrostatic head (mbar) | 75.9 | 86.4 | 100.5 | 61.8 | 63.4 | 76.8 | 60.0 | 60.3 | 67.8 | 66.5 | 72.1 | 85.6 | 66.1 | 68.0 | 82.6 | 52.8 | 61.1 | 76.5 |
| Air Permeability (ft$^3$/ft$^2$/min) | 51.1 | 36.7 | 17.0 | 52.8 | 43.7 | 18.0 | 70.6 | 49.5 | 21.4 | 56.2 | 40.6 | 20.4 | 60.4 | 41.6 | 19.7 | 78.5 | 52.5 | 23.0 |
| Conditions | | | | | | | | | | | | | | | | | | |
| Melt Temperature (C.) | 249 | 249 | 249 | 249 | 249 | 249 | 249 | 249 | 249 | 249 | 249 | 249 | 249 | 249 | 249 | 249 | 249 | 249 |
| Throughput (g/hole/min) | 0.4 | 0.4 | 0.4 | 0.6 | 0.6 | 0.6 | 0.8 | 0.8 | 0.8 | 0.4 | 0.4 | 0.4 | 0.6 | 0.6 | 0.6 | 0.8 | 0.8 | 0.8 |
| DCD (mm) | 200 | 200 | 200 | 200 | 200 | 200 | 250 | 250 | 250 | 200 | 200 | 200 | 200 | 200 | 200 | 250 | 250 | 250 |
| Basis weight (g/m$^2$) | 25 | 35 | 70 | 25 | 35 | 70 | 25 | 35 | 70 | 25 | 35 | 70 | 25 | 35 | 70 | 25 | 35 | 70 |

TABLE 12

Example 5 (continued)

Example 5-

| | 73 | 74 | 75 | 76 | 77 | 78 | 79 | 80 | 81 | 82 | 83 | 84 | 85 | 86 | 87 | 88 | 89 | 90 |
|---|---|---|---|---|---|---|---|---|---|---|---|---|---|---|---|---|---|---|
| Compositions | | | | | | | | | | | | | | | | | | |
| F.2.2 (wt %) | 39 | 39 | 39 | 39 | 39 | 39 | 39 | 39 | 39 | 38.5 | 38.5 | 38.5 | 38.5 | 38.5 | 38.5 | 38.5 | 38.5 | 38.5 |
| S.1 (wt %) | 59 | 59 | 59 | 59 | 59 | 59 | 59 | 59 | 59 | 58.5 | 58.5 | 58.5 | 58.5 | 58.5 | 58.5 | 58.5 | 58.5 | 58.5 |
| S.2 (wt %) | — | — | — | — | — | — | — | — | — | — | — | — | — | — | — | — | — | — |
| S.3 (wt %) | — | — | — | — | — | — | — | — | — | — | — | — | — | — | — | — | — | — |
| Slip concentrate (erucamide) | 2 | 2 | 2 | 2 | 2 | 2 | 2 | 2 | 2 | 3 | 3 | 3 | 3 | 3 | 3 | 3 | 3 | 3 |
| Properties | | | | | | | | | | | | | | | | | | |
| MD Tensile Strength (lb) | 1.7 | 2.3 | 4.1 | 1.4 | 2.3 | 3.8 | 1.3 | 1.7 | 3.6 | 1.3 | 2.3 | 4.2 | 1.5 | 2.2 | 4.7 | 1.1 | 1.8 | 3.7 |

TABLE 12-continued

Example 5 (continued)

Example 5-

| | 73 | 74 | 75 | 76 | 77 | 78 | 79 | 80 | 81 | 82 | 83 | 84 | 85 | 86 | 87 | 88 | 89 | 90 |
|---|---|---|---|---|---|---|---|---|---|---|---|---|---|---|---|---|---|---|
| MD Elongation (%) | 34.3 | 26.4 | 12.4 | 25.1 | 20.3 | 16.4 | 23.4 | 29.2 | 22.2 | 30.8 | 32.2 | 23.1 | 24.9 | 25.1 | 11.2 | 21.7 | 29.4 | 17.4 |
| CD Tensile Strength (lb) | 1.0 | 1.2 | 2.0 | 0.9 | 1.1 | 1.9 | 0.8 | 1.1 | 2.2 | 0.8 | 1.4 | 2.4 | 0.7 | 1.1 | 2.4 | 0.8 | 1.5 | 2.2 |
| CD Elongation (%) | 42.9 | 34.5 | 18.6 | 36.7 | 34.4 | 16.5 | 42.1 | 40.9 | 29.6 | 47.4 | 50.3 | 25.4 | 40.8 | 36.0 | 17.4 | 40.8 | 42.0 | 24.5 |
| Handle (g) | 60.3 | 48.1 | 72.7 | 53.5 | 39.0 | 52.3 | 41.2 | 33.5 | 49.5 | 44.8 | 36.4 | 52.7 | 46.6 | 38.7 | 61.6 | 38.2 | 31.0 | 53.4 |
| Hydrostatic head (mbar) | 64.5 | 63.5 | 74.0 | 60.0 | 67.6 | 63.6 | 47.0 | 45.9 | 54.1 | 64.3 | 71.4 | 75.3 | 55.9 | 60.6 | 71.8 | 51.1 | 52.9 | 64.5 |
| Air Permeability (ft$^3$/ft$^2$/min) | 62.2 | 40.1 | 22.6 | 68.5 | 40.4 | 20.5 | 75.2 | 51.3 | 27.6 | 57.5 | 41.2 | 19.7 | 58.1 | 42.0 | 21.7 | 74.4 | 53.8 | 25.6 |
| Conditions | | | | | | | | | | | | | | | | | | |
| Melt Temperature (C.) | 249 | 249 | 249 | 249 | 249 | 249 | 249 | 249 | 249 | 249 | 249 | 249 | 249 | 249 | 249 | 249 | 249 | 249 |
| Throughput (g/hole/min) | 0.4 | 0.4 | 0.4 | 0.6 | 0.6 | 0.6 | 0.8 | 0.8 | 0.8 | 0.4 | 0.4 | 0.4 | 0.6 | 0.6 | 0.6 | 0.8 | 0.8 | 0.8 |
| DCD (mm) | 200 | 200 | 200 | 200 | 200 | 200 | 250 | 250 | 250 | 200 | 200 | 200 | 200 | 200 | 200 | 250 | 250 | 250 |
| Basis weight (g/m$^2$) | 25 | 35 | 70 | 25 | 35 | 70 | 25 | 35 | 70 | 25 | 35 | 70 | 25 | 35 | 70 | 25 | 35 | 70 |

TABLE 13

Example 6

Example 6-

| | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| Compositions | | | | | | | | | | | | | | | | | | |
| F.2.4 (wt %) | 5 | 5 | 5 | 5 | 5 | 5 | 5 | 5 | 5 | 10 | 10 | 10 | 10 | 10 | 10 | 10 | 10 | 10 |
| S.1 (wt %) | 95 | 95 | 95 | 95 | 95 | 95 | 95 | 95 | 95 | 90 | 90 | 90 | 90 | 90 | 90 | 90 | 90 | 90 |
| S.2 (wt %) | — | — | — | — | — | — | — | — | — | — | — | — | — | — | — | — | — | — |
| S.3 (wt %) | — | — | — | — | — | — | — | — | — | — | — | — | — | — | — | — | — | — |
| Properties | | | | | | | | | | | | | | | | | | |
| MD Tensile Strength (lb) | 1.5 | 2.3 | 4.0 | 1.5 | 2.3 | 2.9 | 1.5 | 2.1 | 4.0 | 1.5 | 2.2 | 3.8 | 1.6 | 2.1 | 2.3 | 1.5 | 2.1 | 4.0 |
| MD Elongation (%) | 4.2 | 2.8 | 1.9 | 2.6 | 2.0 | 1.0 | 5.0 | 3.6 | 2.3 | 10.0 | 6.2 | 2.1 | 4.2 | 2.6 | 0.8 | 8.4 | 5.3 | 2.6 |
| CD Tensile Strength (lb) | 0.8 | 0.9 | 1.7 | 0.7 | 1.0 | 1.4 | 0.8 | 1.0 | 1.7 | 0.7 | 1.1 | 1.7 | 0.7 | 0.9 | 1.4 | 0.9 | 0.9 | 2.1 |
| CD Elongation (%) | 6.0 | 3.6 | 2.3 | 5.4 | 3.5 | 1.4 | 10.1 | 6.7 | 3.4 | 10.5 | 6.0 | 2.6 | 6.7 | 3.7 | 1.5 | 14.9 | 4.9 | 3.8 |
| Handle (g) | 40.3 | 68.5 | 55.4 | 39.9 | — | 54.4 | 36.8 | — | 53.7 | 29.6 | 64.9 | 46.5 | 32.7 | — | 48.6 | 29.5 | — | 48.8 |
| Hydrostatic head (mbar) | 68.5 | 67.5 | 66.5 | 63.0 | 52.4 | 40.5 | 48.0 | 67.0 | 78.8 | 80.3 | 88.5 | 68.1 | 65.1 | 66.8 | 56.0 | 53.9 | 63.0 | 83.5 |
| Air Permeability (ft$^3$/ft$^2$/min) | 43.8 | 32.8 | 19.3 | 49.9 | 36.5 | 18.4 | 63.8 | 43.1 | 19.3 | 44.2 | 31.1 | 17.4 | 51.2 | 35.6 | 18.1 | 58.4 | 40.5 | 19.5 |
| Conditions | | | | | | | | | | | | | | | | | | |
| Melt Temperature (C.) | 266 | 266 | 266 | 266 | 266 | 266 | 266 | 266 | 266 | 266 | 266 | 266 | 266 | 266 | 266 | 266 | 266 | 266 |
| Throughput (g/hole/min) | 0.4 | 0.4 | 0.4 | 0.6 | 0.6 | 0.6 | 0.8 | 0.8 | 0.8 | 0.4 | 0.4 | 0.4 | 0.6 | 0.6 | 0.6 | 0.8 | 0.8 | 0.8 |
| DCD (mm) | 200 | 200 | 200 | 200 | 200 | 200 | 250 | 250 | 250 | 200 | 200 | 200 | 200 | 200 | 200 | 250 | 250 | 250 |
| Basis weight (g/m$^2$) | 25 | 35 | 70 | 25 | 35 | 70 | 25 | 35 | 70 | 25 | 35 | 70 | 25 | 35 | 70 | 25 | 35 | 70 |

TABLE 14

Example 6 (continued)

Example 6-

| | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|
| Compositions | | | | | | | | | | | | | | | | | | |
| F.2.4 (wt %) | 20 | 20 | 20 | 20 | 20 | 20 | 20 | 20 | 20 | 30 | 30 | 30 | 30 | 30 | 30 | 30 | 30 | 30 |
| S.1 (wt %) | 80 | 80 | 80 | 80 | 80 | 80 | 80 | 80 | 80 | 70 | 70 | 70 | 70 | 70 | 70 | 70 | 70 | 70 |
| S.2 (wt %) | — | — | — | — | — | — | — | — | — | — | — | — | — | — | — | — | — | — |
| S.3 (wt %) | — | — | — | — | — | — | — | — | — | — | — | — | — | — | — | — | — | — |

TABLE 14-continued

Example 6 (continued)

| | Example 6- | | | | | | | | | | | | | | | | | |
|---|---|---|---|---|---|---|---|---|---|---|---|---|---|---|---|---|---|---|
| | 19 | 20 | 21 | 22 | 23 | 24 | 25 | 26 | 27 | 28 | 29 | 30 | 31 | 32 | 33 | 34 | 35 | 36 |
| Properties | | | | | | | | | | | | | | | | | | |
| MD Tensile Strength (lb) | 1.5 | 2.4 | 4.2 | 1.7 | 1.9 | 3.2 | 1.6 | 2.3 | 4.1 | 1.5 | 2.1 | 3.6 | 1.5 | 1.9 | 3.4 | 1.5 | 2.1 | 4.2 |
| MD Elongation (%) | 6.4 | 6.9 | 3.2 | 16.7 | 11.6 | 1.5 | 14.7 | 13.9 | 4.5 | 17.9 | 11.7 | 4.7 | 11.4 | 10.2 | 3.4 | 17.3 | 21.0 | 10.1 |
| CD Tensile Strength (lb) | 0.8 | 1.1 | 1.7 | 0.7 | 0.9 | 1.6 | 0.8 | 1.0 | 1.9 | 0.8 | 0.9 | 1.5 | 0.7 | 0.8 | 1.5 | 0.8 | 1.1 | 1.8 |
| CD Elongation (%) | 19.1 | 12.1 | 3.4 | 18.0 | 9.5 | 3.3 | 30.2 | 18.7 | 5.2 | 35.3 | 14.7 | 4.8 | 24.4 | 9.1 | 5.0 | 33.9 | 32.6 | 10.3 |
| Handle (g) | 22.9 | 56.9 | 21.6 | 22.3 | — | 38.5 | 22.3 | — | 28.5 | 21.8 | 45.0 | 29.2 | 25.5 | — | 40.2 | 19.1 | — | 61.7 |
| Hydrostatic head (mbar) | 76.4 | 85.1 | 90.0 | 45.8 | 57.9 | 56.9 | 43.3 | 62.8 | 79.6 | 79.5 | 81.9 | 86.3 | 54.0 | 64.6 | 27.0 | 42.5 | 64.8 | 74.1 |
| Air Permeability (ft³/ft²/min) | 46.9 | 36.2 | 17.0 | 59.5 | 43.6 | 18.4 | 60.9 | 39.5 | 20.1 | 57.2 | 35.5 | 20.5 | 57.0 | 40.9 | 21.3 | 61.6 | 40.0 | 22.1 |
| Conditions | | | | | | | | | | | | | | | | | | |
| Melt Temperature (C.) | 266 | 266 | 266 | 266 | 266 | 266 | 266 | 266 | 266 | 266 | 266 | 266 | 266 | 266 | 266 | 266 | 266 | 266 |
| Throughput (g/hole/min) | 0.4 | 0.4 | 0.4 | 0.6 | 0.6 | 0.6 | 0.8 | 0.8 | 0.8 | 0.4 | 0.4 | 0.4 | 0.6 | 0.6 | 0.6 | 0.8 | 0.8 | 0.8 |
| DCD (mm) | 200 | 200 | 200 | 200 | 200 | 200 | 250 | 250 | 250 | 200 | 200 | 200 | 200 | 200 | 200 | 250 | 250 | 250 |
| Basis weight (g/m²) | 25 | 35 | 70 | 25 | 35 | 70 | 25 | 35 | 70 | 25 | 35 | 70 | 25 | 35 | 70 | 25 | 35 | 70 |

TABLE 15

Example 6 (continued)

| | Example 6- | | | | | | | | | | | | | | | | | |
|---|---|---|---|---|---|---|---|---|---|---|---|---|---|---|---|---|---|---|
| | 37 | 38 | 39 | 40 | 41 | 42 | 43 | 44 | 45 | 46 | 47 | 48 | 49 | 50 | 51 | 52 | 53 | 54 |
| Compositions | | | | | | | | | | | | | | | | | | |
| F.2.4 (wt %) | 40 | 40 | 40 | 40 | 40 | 40 | 40 | 40 | 40 | 39 | 39 | 39 | 39 | 39 | 39 | 39 | 39 | 39 |
| S.1 (wt %) | 60 | 60 | 60 | 60 | 60 | 60 | 60 | 60 | 60 | 59 | 59 | 59 | 59 | 59 | 59 | 59 | 59 | 59 |
| S.2 (wt %) | — | — | — | — | — | — | — | — | — | — | — | — | — | — | — | — | — | — |
| S.3 (wt %) | — | — | — | — | — | — | — | — | — | — | — | — | — | — | — | — | — | — |
| Slip concentrate (erucamide) | — | — | — | — | — | — | — | — | — | 2 | 2 | 2 | 2 | 2 | 2 | 2 | 2 | 2 |
| Properties | | | | | | | | | | | | | | | | | | |
| MD Tensile Strength (lb) | 1.4 | 1.8 | 3.4 | 1.2 | 1.7 | 2.4 | 1.4 | 1.9 | 2.8 | 1.3 | 2.0 | 4.0 | 1.3 | 1.9 | 4.3 | 1.1 | 1.7 | 3.3 |
| MD Elongation (%) | 30.0 | 28.0 | 17.0 | 25.0 | 21.0 | 18.0 | 25.0 | 24.0 | 17.0 | 34.6 | 32.8 | 30.2 | 30.7 | 28.4 | 16.4 | 32.7 | 25.4 | 35.3 |
| CD Tensile Strength (lb) | 0.6 | 0.9 | 1.5 | 0.6 | 0.8 | 1.6 | 0.7 | 0.8 | 1.7 | 0.8 | 1.2 | 2.2 | 0.8 | 1.1 | 2.4 | 0.7 | 1.2 | 2.1 |
| CD Elongation (%) | 51.0 | 35.0 | 10.0 | 33.0 | 30.0 | 27.0 | 41.0 | 38.0 | 20.0 | 58.3 | 55.2 | 42.0 | 45.8 | 45.5 | 24.8 | 41.9 | 42.2 | 44.7 |
| Handle (g) | 16.0 | 35.8 | 60.3 | 18.5 | — | 48.1 | 15.6 | — | 54.2 | 41.0 | 31.9 | 43.7 | 39.5 | 30.5 | 53.7 | 32.7 | 28.2 | 37.3 |
| Hydrostatic head (mbar) | 70.8 | 71.6 | 60.6 | 54.0 | 54.8 | 28.8 | 44.9 | 60.3 | 33.4 | 64.8 | 70.1 | 74.6 | 51.4 | 55.0 | 62.9 | 47.9 | 53.1 | 63.4 |
| Air Permeability (ft³/ft²/min) | 43.4 | 38.6 | 21.1 | 57.4 | 40.4 | 39.3 | 54.0 | 39.3 | 25.3 | 61.7 | 41.5 | 21.9 | 72.7 | 44.9 | 21.2 | 79.8 | 57.4 | 25.6 |
| Conditions | | | | | | | | | | | | | | | | | | |
| Melt Temperature (C.) | 266 | 266 | 266 | 266 | 266 | 266 | 266 | 266 | 266 | 249 | 249 | 249 | 249 | 249 | 249 | 249 | 249 | 249 |
| Throughput (g/hole/min) | 0.4 | 0.4 | 0.4 | 0.6 | 0.6 | 0.6 | 0.8 | 0.8 | 0.8 | 0.4 | 0.4 | 0.4 | 0.6 | 0.6 | 0.6 | 0.8 | 0.8 | 0.8 |
| DCD (mm) | 200 | 200 | 200 | 200 | 200 | 200 | 250 | 250 | 250 | 200 | 200 | 200 | 200 | 200 | 200 | 250 | 250 | 250 |
| Basis weight (g/m²) | 25 | 35 | 70 | 25 | 35 | 70 | 25 | 35 | 70 | 25 | 35 | 70 | 25 | 35 | 70 | 25 | 35 | 70 |

TABLE 16

Example 7

| | Example 7- | | | | | | | | |
|---|---|---|---|---|---|---|---|---|---|
| | 1 | 2 | 3 | 4 | 5 | 6 | 7 | 8 | 9 |
| Compositions | | | | | | | | | |
| F.2.4 (wt %) | 20 | 20 | 20 | 20 | 20 | 20 | 20 | 20 | 20 |
| S.1 (wt %) | — | — | — | — | — | — | — | — | — |
| S.2 (wt %) | 80 | 80 | 80 | 80 | 80 | 80 | 80 | 80 | 80 |
| S.3 (wt %) | — | — | — | — | — | — | — | — | — |
| Slip concentrate (erucamide) | — | — | — | — | — | — | — | — | — |
| Properties | | | | | | | | | |
| MD Tensile Strength (lb) | 1.3 | 1.9 | 4.1 | 1.7 | 2.3 | 4.4 | 1.4 | 1.9 | 4.4 |
| MD Elongation (%) | 31.5 | 33.3 | 18.6 | 27.7 | 16.3 | 4.7 | 20.5 | 18.9 | 9.5 |
| CD Tensile Strength (lb) | 0.7 | 0.9 | 1.8 | 0.8 | 1.0 | 1.9 | 0.8 | 0.8 | 1.6 |
| CD Elongation (%) | 76.0 | 55.8 | 25.5 | 51.3 | 38.6 | 7.9 | 41.2 | 34.5 | 10.6 |
| Handle (g) | 44.1 | 44.5 | 110.0 | 53.7 | 58.2 | 149.0 | 60.1 | 52.7 | 137.0 |
| Hydrostatic head (mbar) | 76.1 | 67.6 | 82.1 | 69.8 | 73.0 | 61.4 | 63.0 | 55.9 | 78.0 |
| Air Permeability (ft$^3$/ft$^2$/min) | 49.4 | 41.7 | 22.3 | 63.2 | 44.7 | 22.6 | 63.1 | 44.7 | 21.7 |
| Conditions | | | | | | | | | |
| Melt Temperature (C.) | 249 | 249 | 249 | 249 | 249 | 249 | 249 | 249 | 249 |
| Throughput (g/hole/min) | 0.4 | 0.4 | 0.4 | 0.6 | 0.6 | 0.6 | 0.8 | 0.8 | 0.8 |
| DCD (mm) | 200 | 200 | 200 | 200 | 200 | 200 | 250 | 250 | 250 |
| Basis weight (g/m$^2$) | 25 | 35 | 70 | 25 | 35 | 70 | 25 | 35 | 70 |

Having described the elements of the fabrics in its various aspects and ranges, described herein is, in a first embodiment:

1. A nonwoven fabric comprising (or consisting essentially of):
   (a) within the range of from 1 to 49 wt %, by weight of the fabric, of a reactor grade propylene-α-olefin copolymer possessing;
   (i) within the range of from 5 to 35 wt %, by weight of the copolymer, of units derived from one or more of ethylene and/or $C_4$ to $C_{12}$ α-olefins;
   (ii) a melt flow rate (230° C./2.16 kg) within the range of from 500 to 7500 g/10 min and a weight average molecular weight of less than 200,000; and
   (iii) a heat of fusion, $\Delta H_f$, within the range of from 0.5 to 75 J/g; and
   (b) a second polypropylene having a melting point, $T_m$, of greater than 110° C. and
   a melt flow rate (230° C./2.16 kg) within the range of from 20 to 7500 g/10 min; wherein the fabric has a Handle value of less than 60% (measuring the fabric of 35 g/m$^2$ basis weight).

2. The nonwoven fabric of numbered embodiment 1, wherein the fabric consists essentially of the reactor grade propylene-α-olefin copolymer and the second polypropylene.

3. The nonwoven fabric of numbered embodiments 1 and 2, wherein a weight average molecular weight of the reactor grade propylene-α-olefin copolymer is within the range of from 10,000 to 200,000.

4. The nonwoven fabric of any one of the previously numbered embodiments, wherein the reactor grade propylene-α-olefin copolymer has a melting point $T_m$ of less than 80° C.

5. The nonwoven fabric of any one of the previously numbered embodiments, wherein chain scissioning byproducts are substantially absent from the reactor grade propylene-α-olefin copolymer.

6. The nonwoven fabric of any one of the previously numbered embodiments, wherein the reactor grade propylene-α-olefin copolymer is prepared by reacting propylene, ethylene and a metallocene catalyst composition.

7. The nonwoven fabric of any one of the previously numbered embodiments, wherein the fabric has been annealed at a temperature within the range of from 70 to 130° C. for 1 to 10 seconds.

8. The nonwoven fabric of numbered embodiment 7, wherein the fabric has an MD Elongation value within the range of from 10 to 60%, and a CD Elongation value within the range of from 5 to 50% (measuring the fabric of 35 g/m$^2$ basis weight for both).

9. The nonwoven fabric of numbered embodiment 7, wherein the fabric has a Hydrostatic Head value of greater than 50 mbar (measuring the fabric of 35 g/m$^2$ basis weight).

10. The nonwoven fabric of numbered embodiment 7, wherein the fabric has an Air Permeability value of greater than 30 ft$^3$/ft$^2$/min (9.1 m$^3$/m$^2$/min) (measuring the fabric of 35 g/m$^2$ basis weight).

11. The nonwoven fabric of any one of the previously numbered embodiments, wherein the fabric comprises from 10 to 40 wt %, by weight of the composition, of the reactor grade propylene-α-olefin copolymer.

12. The nonwoven fabric of any one of the previously numbered embodiments, wherein the reactor grade propylene-α-olefin copolymer comprises within the range of from 8 to 18 wt %, by weight of the copolymer, of ethylene-derived units.

13. The nonwoven fabric of any one of the previously numbered embodiments, wherein the second polypropylene is a propylene homopolymer or propylene copolymer comprising from 0.01 to 5 wt % comonomer, wherein the second polypropylene has a melting point of 110° C. or more.

14. A structure comprising two or more layers of fabric comprising at least one layer of the fabric of any one of the previously numbered embodiments.

15. A method of forming a nonwoven fabric of any one of the previously numbered embodiments:
   (a) reacting propylene with an α-olefin selected from ethylene and $C_4$ to $C_{12}$ α-olefins and a bridged metallocene catalyst composition at a temperature within the range of from 80 to 120° C.;

(b) isolating a reactor grade propylene-α-olefin copolymer possessing a melt flow rate within the range of from 500 to 7500 g/10 min and a weight average molecular weight of less than 200,000;

(c) blending within the range of from 1 to 49 wt %, by weight of the fabric, of the reactor grade propylene-α-olefin copolymer and a second polypropylene to form a composition; and (d) meltblowing the composition to form a nonwoven fabric, wherein the fabric has a Handle value of less than 60% (measuring the fabric of 35 g/m² basis weight).

16. The method of any one of the previously numbered embodiments, further comprising the step of annealing the fibers or fabric at a temperature within the range of from 70 to 130° C. for 1 to 10 seconds.

Also disclosed herein is the use of a nonwoven fabric comprising (a) within the range of from 1 to 49 wt %, by weight of the fabric, of a reactor grade propylene-α-olefin copolymer possessing; (i) within the range of from 5 to 35 wt %, by weight of the copolymer, of units derived from one or more of ethylene and/or $C_4$ to $C_{12}$ α-olefins; (ii) a melt flow rate (230° C./2.16 kg) within the range of from 260 to 7260 g/10 min and a weight average molecular weight of less than 200,000; and (iii) a heat of fusion, $\Delta H_f$, within the range of from 0.5 to 75 J/g; and (b) a second polypropylene having a melting point, $T_m$, of greater than 110° C. and a melt flow rate (230° C./2.16 kg) within the range of from 20 to 7260 g/10 min; wherein the fabric has a Handle value of less than 60% (measuring the fabric of 35 g/m² basis weight).

The invention claimed is:

1. A method of forming a nonwoven fabric comprising:
(a) reacting propylene with an α-olefin selected from ethylene and $C_4$ to $C_{12}$ α-olefins and a bridged metallocene catalyst composition at a temperature within the range of from 80 to 120° C.;
(b) isolating a reactor grade propylene-α-olefin copolymer possessing a melt flow rate within the range of from 260 to 7260 g/10 min and a weight average molecular weight of less than 200,000;
(c) blending within the range of from 1 to 49 wt %, by weight of the fabric, of the reactor grade propylene-α-olefin copolymer and a second polypropylene to form a composition; and
(d) meltblowing the composition to form a nonwoven fabric, wherein the fabric has a Handle value of less than 60 grams (measuring the fabric of 35 g/m² basis weight).

2. The method of claim 1, further comprising the step of annealing the fibers or fabric at a temperature within the range of from 70 to 130° C. for 1 to 10 seconds.

3. The method of claim 1, wherein the α-olefin is selected from ethylene, 1-butene, 1-octene and 1-hexene.

4. The method of claim 1, blending within the range of from 5 to 40 wt %, by weight of the fabric, of the reactor grade propylene-α-olefin copolymer.

5. The method of claim 1, wherein chain scissioning byproducts are substantially absent from the reactor grade propylene-α-olefin copolymer.

6. The method of claim 1, wherein the fabric has an MD Elongation value within the range of from 2 to 40%, and a CD Elongation value within the range of from 5 to 60% (measuring the fabric of 35 g/m² basis weight for both).

7. The method of claim 1, wherein the fabric has a Hydrostatic Head value of greater than 50 mbar (measuring the fabric of 35 g/m² basis weight).

8. The method of claim 1, wherein the fabric has an Air Permeability value of greater than 30 ft³/ft²/min (9.1 m³/m²/min) (measuring the fabric of 35 g/m² basis weight).

9. The method of claim 1, wherein the composition is meltblown at a melt temperature within the range of from 230 to 280° C. and a throughput within the range of from 0.2 to 2.0 g/hole/min.

* * * * *